US007705497B2

(12) United States Patent
Arich et al.

(10) Patent No.: US 7,705,497 B2
(45) Date of Patent: Apr. 27, 2010

(54) POWER TOOL COOLING

(75) Inventors: Klaus-Dieter Arich, Huenstetten-Beuerbach (DE); Erhard Benner, Hellenhahn (DE); Manfred Droste, Limburg-Offheim (DE); Uwe Nemetz, Hünfelden Nauheim (DE); Martin Soika, Idstein (DE); Michael Kunz, Dorndorf (DE)

(73) Assignee: Black & Decker Inc., Newark, DE (US)

( * ) Notice: Subject to any disclaimer, the term of this patent is extended or adjusted under 35 U.S.C. 154(b) by 456 days.

(21) Appl. No.: 11/321,310

(22) Filed: Dec. 29, 2005

(65) Prior Publication Data

US 2006/0144602 A1 Jul. 6, 2006

(30) Foreign Application Priority Data

Dec. 23, 2004 (GB) ................................ 0428210.9
May 27, 2005 (GB) ................................ 0510934.3

(51) Int. Cl.
*H02K 9/06* (2006.01)
*B25D 13/00* (2006.01)
*B25D 17/20* (2006.01)

(52) U.S. Cl. .......................... 310/62; 173/48; 173/117; 173/217; 310/50; 310/58

(58) Field of Classification Search ................... 310/50, 310/62–63, 89, 58; 173/48, 104, 217, 117
See application file for complete search history.

(56) References Cited

U.S. PATENT DOCUMENTS 1,841,781 A 1/1932 Bisschop et al.
1,990,035 A 2/1935 Kratz et al
2,373,665 A 4/1945 Emery
2,456,571 A 12/1948 Turner
2,526,976 A * 10/1950 Smith ............................ 74/44
2,899,934 A 8/1959 Salengro
2,949,944 A * 8/1960 Blachly ....................... 30/394
3,147,549 A 9/1964 Aspeek
3,456,740 A 7/1969 Paul et al.
3,718,193 A * 2/1973 Wanner ...................... 173/117
3,741,317 A 6/1973 Unterschweger et al.

(Continued)

FOREIGN PATENT DOCUMENTS

DE 3329005 2/1985

(Continued)

*Primary Examiner*—Burton Mullins
(74) *Attorney, Agent, or Firm*—Kofi Schulterbrandt; Scott B. Markow; Adan Ayala

(57) ABSTRACT

A power tool cooling system comprises a cooling fan disposed on a motor in a position between the upper field coil and the lower commutator. A transmission housing encapsulates the transmission mechanism. During operation, the fan is driven by the motor and draws air axially through the motor and expels the air radially outwardly through holes in the outer housing of the motor. This causes air to be drawn in through the air vents formed on the top of a tool housing, in the side of the housing and between the housing and a battery pack. The cool air flows outside of the transmission housing, but inside the tool housing such that air does not pass through the transmission mechanism. A plurality of motor openings are also formed in the outer housing of the motor to enable cool air to pass into the motor to cool the motor.

10 Claims, 25 Drawing Sheets

U.S. PATENT DOCUMENTS

| | | | | |
|---|---|---|---|---|
| 3,748,507 | A | 7/1973 | Sieber | |
| 3,845,336 | A | 10/1974 | Moores, Jr. et al. | |
| 4,342,931 | A | 8/1982 | Grossmann et al. | |
| 4,442,906 | A | 4/1984 | Simpson | |
| 4,582,144 | A | 4/1986 | Mizutani | |
| 4,609,053 | A | 9/1986 | Ragnmark | |
| 4,611,670 | A | 9/1986 | Chromy | |
| 4,766,963 | A * | 8/1988 | Hartwig et al. | 173/109 |
| 5,025,870 | A | 6/1991 | Gantner | |
| 5,036,926 | A | 8/1991 | Cavedo | |
| 5,052,497 | A * | 10/1991 | Houben et al. | 173/109 |
| 5,285,858 | A | 2/1994 | Okada et al. | |
| 5,320,177 | A | 6/1994 | Shibata et al. | |
| 5,337,835 | A | 8/1994 | Bohne et al. | |
| 5,419,404 | A | 5/1995 | Niemi et al. | |
| 5,435,397 | A | 7/1995 | Demuth | |
| 5,533,579 | A | 7/1996 | Chu | |
| 5,624,000 | A * | 4/1997 | Miller | 173/216 |
| 5,678,641 | A | 10/1997 | Manschitz et al. | |
| 5,775,440 | A | 7/1998 | Shinma | |
| 5,797,463 | A | 8/1998 | Winter et al. | |
| 5,842,527 | A | 12/1998 | Arakawa et al. | |
| 5,947,211 | A | 9/1999 | Jakobsson | |
| 5,954,140 | A | 9/1999 | Bauer | |
| 6,070,675 | A | 6/2000 | Mayer et al. | |
| 6,076,616 | A | 6/2000 | Kramp et al. | |
| 6,123,158 | A | 9/2000 | Steffen | |
| 6,127,751 | A * | 10/2000 | Kristen et al. | 310/50 |
| 6,170,579 | B1 | 1/2001 | Wadge | |
| 6,176,321 | B1 | 1/2001 | Arakawa et al. | |
| 6,182,881 | B1 | 2/2001 | Kellner et al. | |
| 6,213,222 | B1 | 4/2001 | Banach | |
| 6,325,157 | B1 * | 12/2001 | Arakawa et al. | 173/201 |
| 6,332,841 | B1 | 12/2001 | Secord | |
| 6,363,618 | B1 | 4/2002 | Durr | |
| 6,431,289 | B1 * | 8/2002 | Potter et al. | 173/47 |
| 6,484,814 | B2 | 11/2002 | Bongers-Ambrosius et al. | |
| 6,523,622 | B1 | 2/2003 | Berger et al. | |
| 6,536,536 | B1 * | 3/2003 | Gass et al. | 173/2 |
| 6,543,549 | B1 * | 4/2003 | Riedl et al. | 173/216 |
| 6,575,254 | B2 | 6/2003 | Bongers-Ambrosius et al. | |
| 6,619,149 | B2 | 9/2003 | Funfer | |
| 6,651,860 | B2 | 11/2003 | Artmann et al. | |
| 6,675,908 | B1 | 1/2004 | Fruahammer et al. | |
| 6,725,945 | B2 | 4/2004 | Sugimoto et al. | |
| 6,742,601 | B2 | 6/2004 | Numata | |
| 6,763,897 | B2 * | 7/2004 | Hanke et al. | 173/210 |
| 6,776,245 | B2 * | 8/2004 | Kristen et al. | 173/217 |
| 6,799,643 | B2 | 10/2004 | Voulkidis et al. | |
| 6,866,105 | B2 * | 3/2005 | Pfisterer et al. | 173/117 |
| 6,902,012 | B2 | 6/2005 | Kristen et al. | |
| 6,913,088 | B2 | 7/2005 | Berger | |
| 6,913,089 | B2 | 7/2005 | Stirm | |
| 6,948,570 | B2 | 9/2005 | Kristen et al. | |
| 6,962,211 | B2 | 11/2005 | Daubner et al. | |
| 6,971,456 | B2 * | 12/2005 | Yamada et al. | 173/217 |
| 6,988,563 | B2 | 1/2006 | Hashimoto et al. | |
| 7,249,695 | B2 * | 7/2007 | Shew | 222/333 |
| 7,308,950 | B2 * | 12/2007 | Faatz et al. | 173/217 |
| 7,331,408 | B2 | 2/2008 | Arich et al. | |
| 2004/0251039 | A1 | 12/2004 | Burger et al. | |
| 2006/0156859 | A1 * | 7/2006 | Nemetz | 74/606 R |

FOREIGN PATENT DOCUMENTS

| | | | |
|---|---|---|---|
| DE | 4000861 | | 7/1991 |
| DE | 4441820 | | 5/1996 |
| DE | 19651723 | | 6/1997 |
| DE | 19955591 | | 7/2000 |
| DE | 10305350 | | 8/2003 |
| DE | 3220795 | | 12/2003 |
| DE | 10242414 | | 3/2004 |
| DE | 10330180 | | 1/2005 |
| EP | 0052102 | | 6/1980 |
| EP | 0226644 | | 7/1987 |
| EP | 0345896 | | 12/1989 |
| EP | 0403789 | | 12/1990 |
| EP | 0759342 | | 2/1997 |
| EP | 0794038 | | 9/1997 |
| EP | 0984545 | | 3/2000 |
| EP | 1323501 | | 7/2003 |
| EP | 1464449 | | 1/2004 |
| GB | 2102718 | | 2/1983 |
| GB | 2102718 | A * | 2/1983 |
| GB | 2154497 | | 9/1985 |
| GB | 2237528 | | 5/1991 |
| GB | 2295347 | | 5/1996 |
| JP | 2002101614 | | 4/2002 |
| JP | 2002101614 | A * | 4/2002 |
| WO | 9956917 | | 11/1999 |

* cited by examiner

FIG.15.c

POWER TOOL COOLING

FIELD OF THE INVENTION

The present invention relates to a cooling system for a power tool, and relates particularly, but not exclusively, to a cooling system for a hammer drill.

BACKGROUND OF THE INVENTION

Hammer drills are power tools that can generally operate in three modes of operation. Hammer drills have a tool bit that can be operated in a hammer mode, a rotary mode and a combined hammer and a rotary mode.

Hammer drills, like many power tools, generate a lot of heat during use. In particular, the electric motor of the hammer drill generates large amounts of heat and needs to be cooled. Prior art hammer drill cooling systems are known in which air is drawn into the outer housing of the hammer drill to cool the motor. Prior art hammer drill cooling systems can suffer from the drawback that the air that is drawn into the tool may be contaminated with dust and other materials formed during use of the tool, and if this dust and dirt gets into the moving parts of the transmission mechanism, damage can be caused to the power tool.

Preferred embodiments of the present invention seek to overcome the above disadvantage of the prior art.

BRIEF SUMMARY OF THE INVENTION

According to the present invention, there is provided a power tool comprising:

an outer housing for gripping by a user;

a motor disposed in the outer housing and having an output shaft for actuating a working member of the tool;

a cooling fan adapted to be driven by the motor for causing air to flow past the motor; and a transmission mechanism adapted to actuate said working member in response to rotation of said output shaft, and having an inner housing for supporting the transmission mechanism in the outer housing, wherein the outer housing has at least one air inlet and at least one air outlet and the cooling fan is adapted to cause air to flow from at least one inlet between said inner and outer housing to said motor.

By providing a power tool having an inner housing for supporting a transmission mechanism inside an outer housing, wherein the outer housing has at least one air inlet, at least one air outlet and a cooling fan adapted to cause air to flow from at least one inlet between said inner and outer housings to the motor, this provides the advantage that the motor is cooled whilst the transmission mechanism is protected from dust that can cause damage to the transmission mechanism. Nevertheless, the transmission mechanism is cooled to some degree as the air flows over the inner housing which acts as a heat sink for dissipating the heat generated by the transmission mechanism located therein.

The motor may comprise a motor housing having a plurality of apertures for permitting the flow of air through the motor. This provides the advantage of increasing the cooling of the motor.

Preferably, the motor housing is connected to the inner housing in a manner sealed against air flow between the motor housing and the inner housing. This permits easy connection of the output shaft to the transmission mechanism whilst ensuring that any dust and dirt entrained in the air flowing through the motor is prohibited from entering the transmission mechanism where it could damage the moving parts.

The power tool may further comprise at least one air inlet disposed on an upper surface of the outer housing, at least one air inlet disposed on a side of the outer housing, and at least one air inlet disposed on the outer housing adjacent a releasable battery pack in use. This maximises the amount of air flowing over the surface of the inner housing (from all directions) so as to help the heat sink cooling effect of the inner housing.

In a preferred embodiment, the cooling fan is disposed between a field coil and a commutator of the motor. This provides the advantage of ensuring that cool air flows over both the field coil and the commutator of the motor to increase the cooling of the motor.

The power tool may further comprise at least one air outlet disposed on the outer housing forwardly of the motor, and at least one air outlet disposed on the outer housing adjacent a releasable battery pack in use.

In a preferred embodiment, the power tool is a hammer drill.

BRIEF DESCRIPTION OF THE DRAWINGS

Preferred embodiment of the present invention will now be described by way of example only and not in any limitative sense, with reference to the accompanying drawings in which:

FIG. 15*c* is a perspective view of the inside of the clamshell half of FIG. 15*a;*

DETAILED DESCRIPTION OF THE INVENTION

Figure 1:
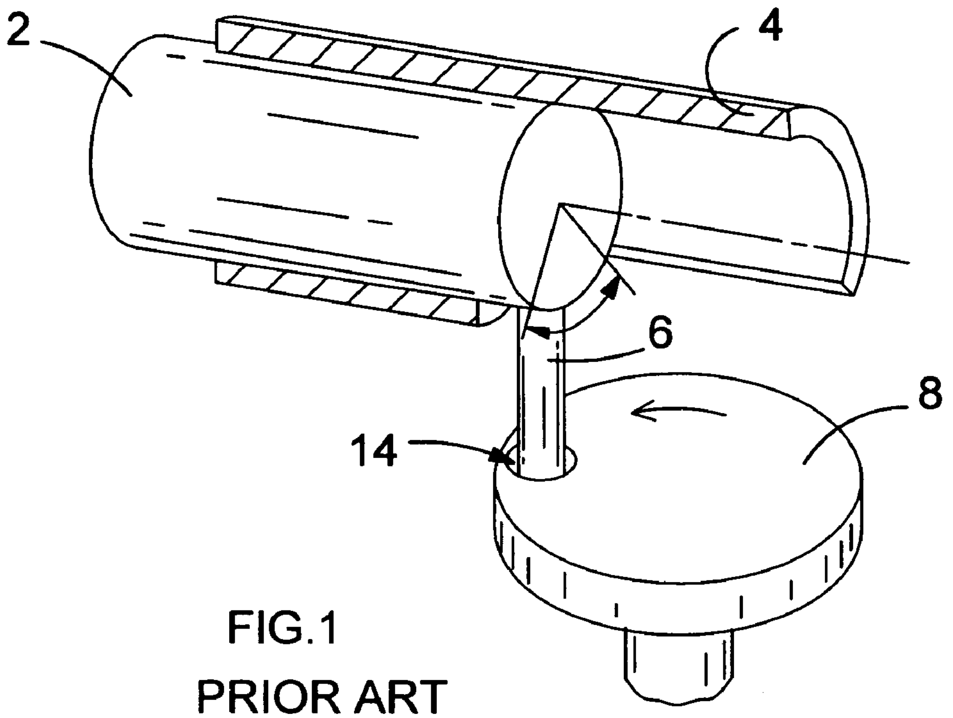
FIG.1 PRIOR ART
FIG. 1 is a partially cut away perspective view of a prior art drive mechanism for a hammer drill.
Figure 2:
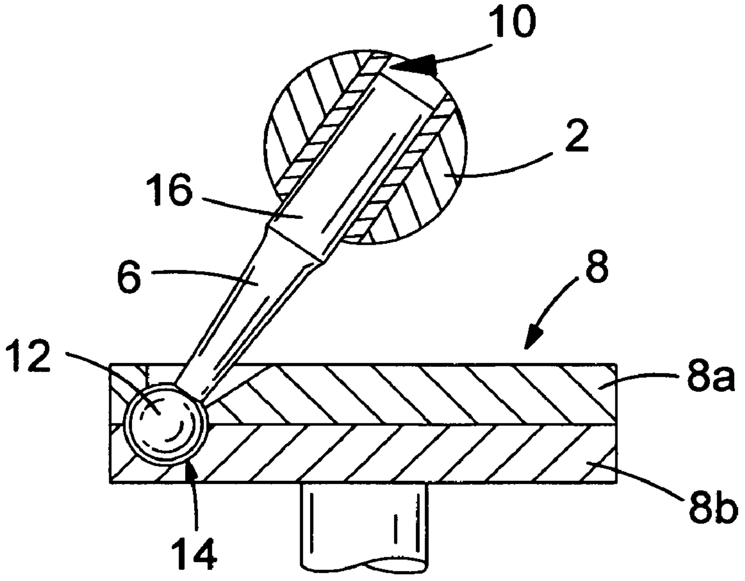
FIG.2 PRIOR ART
FIG. 2 is a cross-sectional view of the drive mechanism of FIG. 1.
Figure 3:
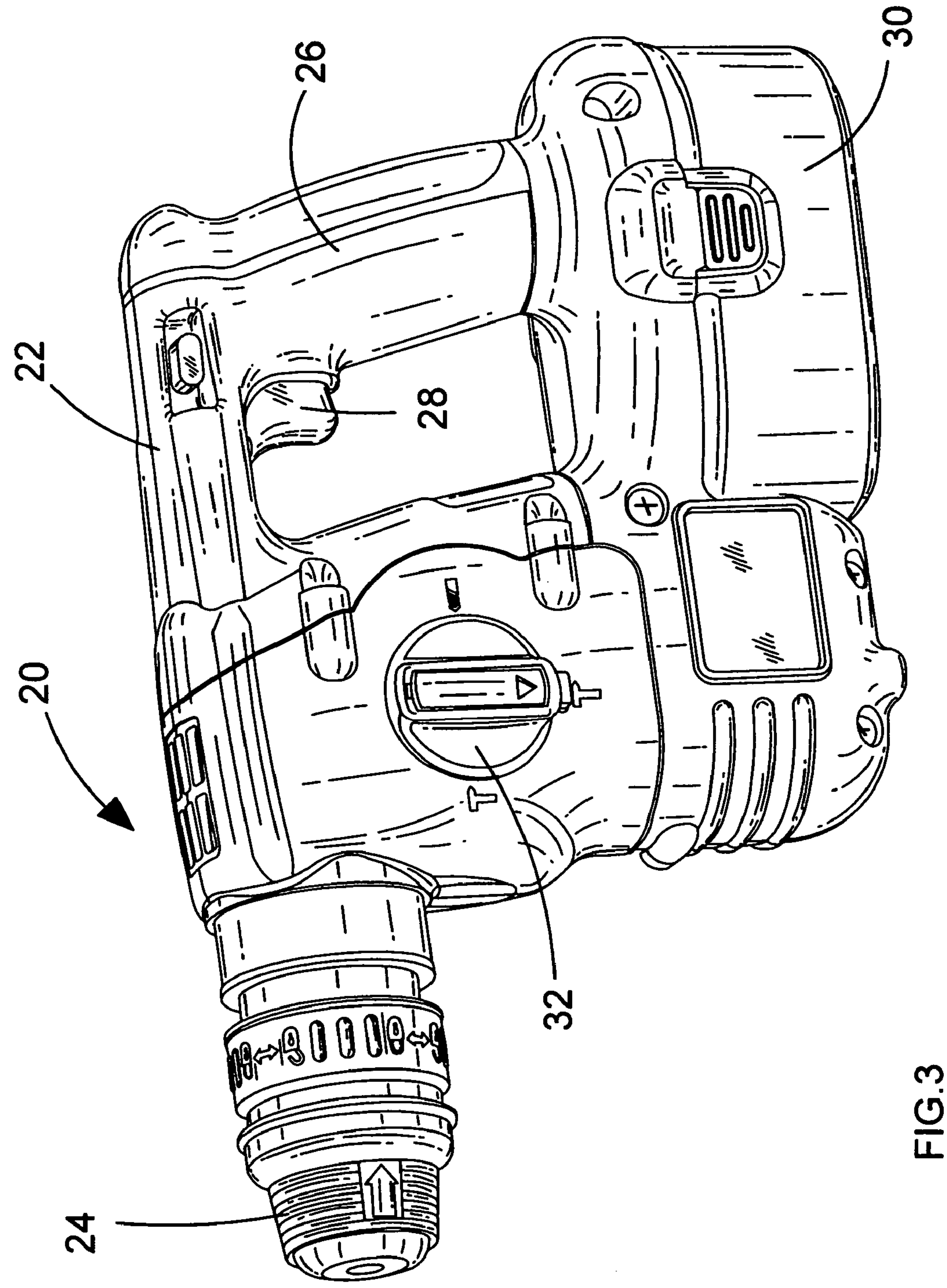
FIG. 3 is a perspective view of a hammer drill of a first embodiment of the present invention.

Referring to FIG. 3, a battery-powered hammer drill comprises a tool housing 22 and a chuck 24 for holding a drill bit (not shown). The tool housing 22 forms a handle 26 having a trigger 28 for activating the hammer drill 20. A battery pack 30 is releasably attached to the bottom of the tool housing 22. A mode selector knob 32 is provided for selecting between a hammer only mode, a rotary only mode and a combined hammer and rotary mode of operation of the drill bit.

Figure 4:
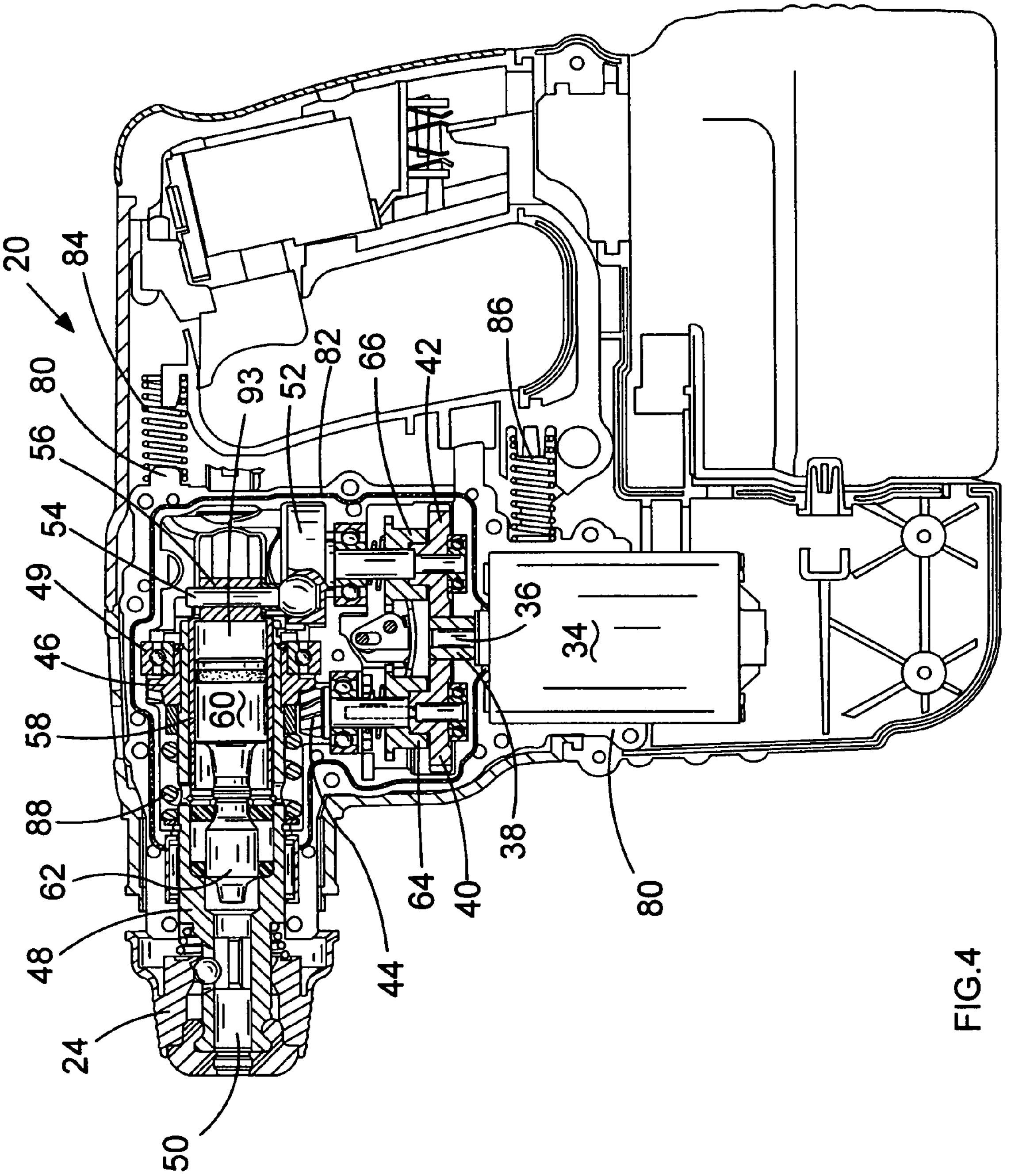
FIG. 4 is a side cross-sectional view of the hammer drill of FIG. 3.

Referring to FIG. 4, an electric motor 34 is provided in the tool housing 22 and has a rotary output shaft 36. A pinion 38 is formed on the end of output shaft 36, the pinion 38 meshing with a first drive gear 40 of a rotary drive mechanism and a second drive gear 42 of a hammer drive mechanism.

The rotary drive mechanism shall be described as follows. A first bevel gear 44 is driven by the first drive gear 40. The first bevel gear 44 meshes with a second bevel gear 46. The second bevel gear 46 is mounted on a spindle 48. Rotation of the second bevel gear 46 is transmitted to the spindle 48 via a clutch mechanism including an overload spring 88. The spindle 48 is mounted for rotation about its longitudinal axis by a spherical ball bearing race 49. A drill bit (not shown) can be inserted into the chuck 24 and connected to the forward end 50 of spindle 48. The spindle 48 and the drill bit rotate when the hammer drill 20 is in a rotary mode or in a combined hammer and rotary mode. The clutch mechanism prevents excessive torques being transmitted from the drill bit and the spindle 48 to the motor 34.

The hammer drive mechanism shall now be described as follows. The pinion 38 of motor output shaft 36 meshes with a second drive gear 42 such that rotation of the second drive gear 42 causes rotation of a crank plate 52. A crank pin 54 is driven by the crank plate 52 and slidably engages a cylindrical bearing 56 disposed on the end of a hollow piston 58. The hollow piston 58 is slidably mounted in the spindle 48 such that rotation of the crank plate 52 causes reciprocation of hollow piston 58 in the spindle 48. A ram 60 is slidably disposed inside hollow piston 58. Reciprocation of the hollow piston 58 causes the ram 60 to reciprocate with the hollow piston 58 as a result of expansion and contraction of an air cushion 93, as will be familiar to persons skilled in the art. Reciprocation of the ram 60 causes the ram 60 to impact a beat piece 62 which in turn transfers impacts to the drill bit (not shown) in the chuck 24 when the hammer drill operating in a hammer mode or a in combined hammer and rotary mode.

A mode change mechanism includes a first and a second drive sleeves 64, 66 which selectively couple the first and second drive gears 40, 42 respectively, to the first bevel gear 44 and the crank plate 52, respectively, in order to allow a user to select between either the hammer only mode, the rotary only mode or the combined hammer and rotary mode. The mode change mechanism is the subject of UK patent application no. 0428215.8.

A transmission mechanism comprises the rotary drive mechanism, the hammer drive mechanism and the mode change mechanism. The transmission mechanism is disposed inside a transmission housing 80. The transmission housing 80 also supports the electric motor 34. The transmission housing is formed from two clamshell halves of durable plastics material or cast metal, the two clamshell halves compressing an o-ring 82 therebetween. The o-ring 82 seals the transmission housing 80 to prevent dust and dirt from entering the transmission housing and damaging the moving parts of the transmission mechanism.

The transmission housing 80 is slidably mounted inside the tool housing 22 on parallel rails (not shown) and is supported against to the tool housing 22 by first and second damping springs 84 and 86 disposed at its rearward end. The transmission housing 80 can therefore move by a small amount relative to tool housing 22 in order to reduce transmission of vibration to the user during operation of the hammer drill 20. The spring co-efficients of the first and second damping springs 84 and 86 are chosen so that the transmission housing 80 slides to a point generally mid-way between its limits of forward and rearward travel when the hammer drill 20 is used in normal operating conditions. This is a point of equilibrium where the forward bias of the damping springs 84 and 86 equals the rearward force on the transmission housing 80 caused by the user placing the hammer drill 20 against a workpiece and leaning against the tool housing 22.

Figure 5:
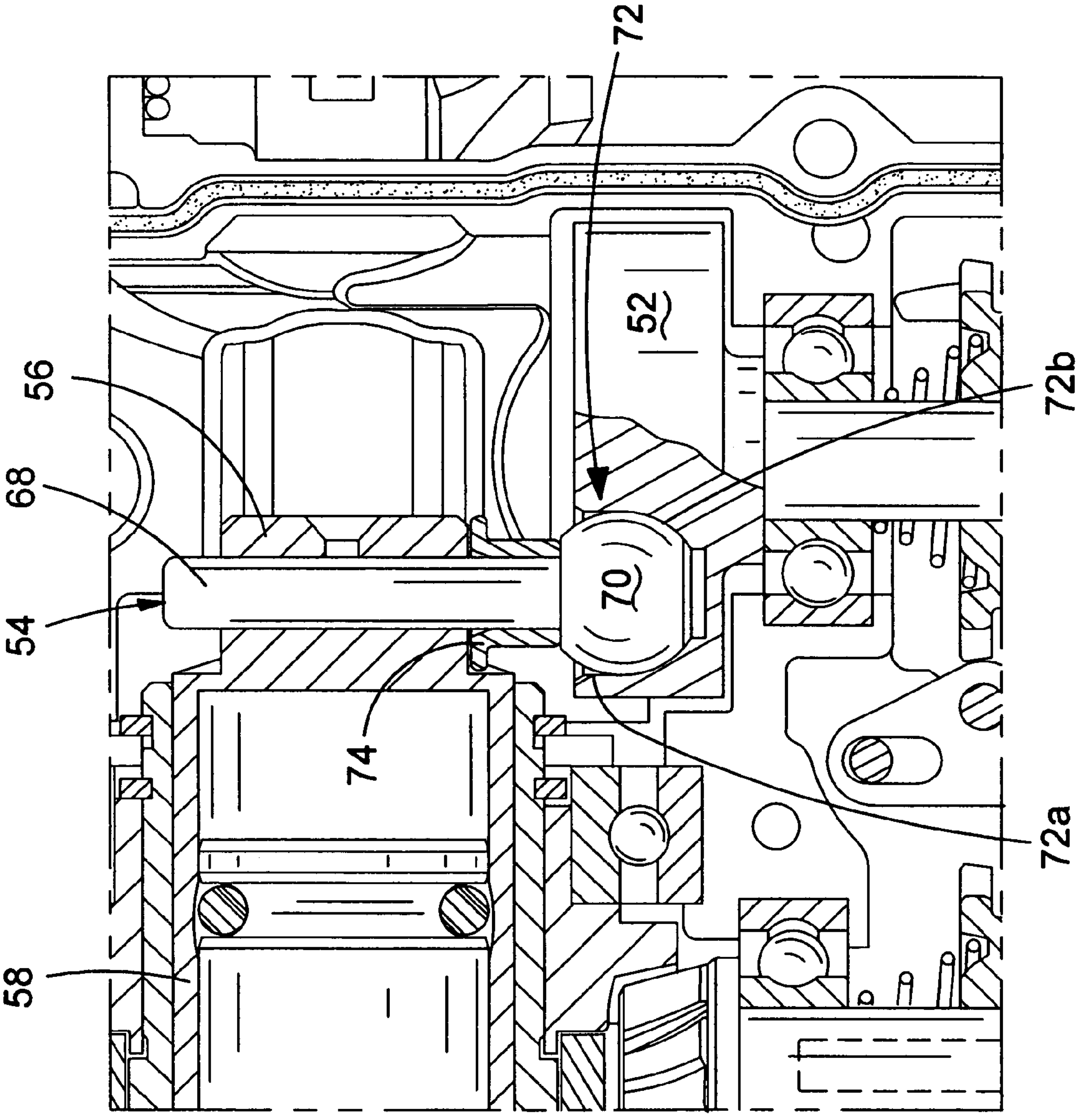
FIG. 5 is an enlarged side cross-sectional view of part of the hammer drill of FIG. 4.

Referring to FIG. 5, the hammer drive mechanism will be described in more detail. The crank pin 54 comprises a cylindrical link member 68 rigidly connected to a part-spherical bearing 70. The part-spherical bearing 70 is slidably and rotatably disposed in a cup-shaped recess 72 formed in the crank plate 52. The cup-shaped recess 72 has an upper cylindrical portion 72*a* and a lower generally semi-spherical portion 72*b*. The upper cylindrical portion 72*a* and a lower semi-spherical portion 72*b* have the same maximum diameter which is slightly greater than that of the part-spherical bearing 70. As a result, the part-spherical bearing 70 can be easily inserted into the cup-shaped recess. The crank pin 4 can pivot, rotate and slide vertically relative to the crank plate whilst the part-spherical bearing remains within the confines of the cup-shaped recess 72.

The cylindrical link member 68 is slidably disposed in a cylindrical bearing 56 formed in the end of the hollow piston 58. Sliding friction in the cup-shaped recess 72 is slightly greater than in the cylindrical bearing 56. The cylindrical link member 68 therefore slides up and down in the cylindrical bearing 56 while the part-spherical bearing rocks back and forth in the cup-shaped recess. A cylindrical collar member 74 surrounds the cylindrical link member 68 of the crank pin 54 and can slide between a lower position in which it abuts the upper surface of the part-spherical bearing 70 and an upper position in which it abuts and the underside of the cylindrical bearing 56. The collar member 74 is precautionary feature that limits movement of the part-spherical bearing 70 towards the cylindrical bearing 56 so that it is impossible for the crank pin 54 and its the part-spherical bearing 70 to move totally out of engagement with the cup-shaped recess 72. The cylindrical collar member 74 can be mounted to the crank pin 54 after construction of the crank plate 52 and crank pin 54 assembly.

Figure 6:
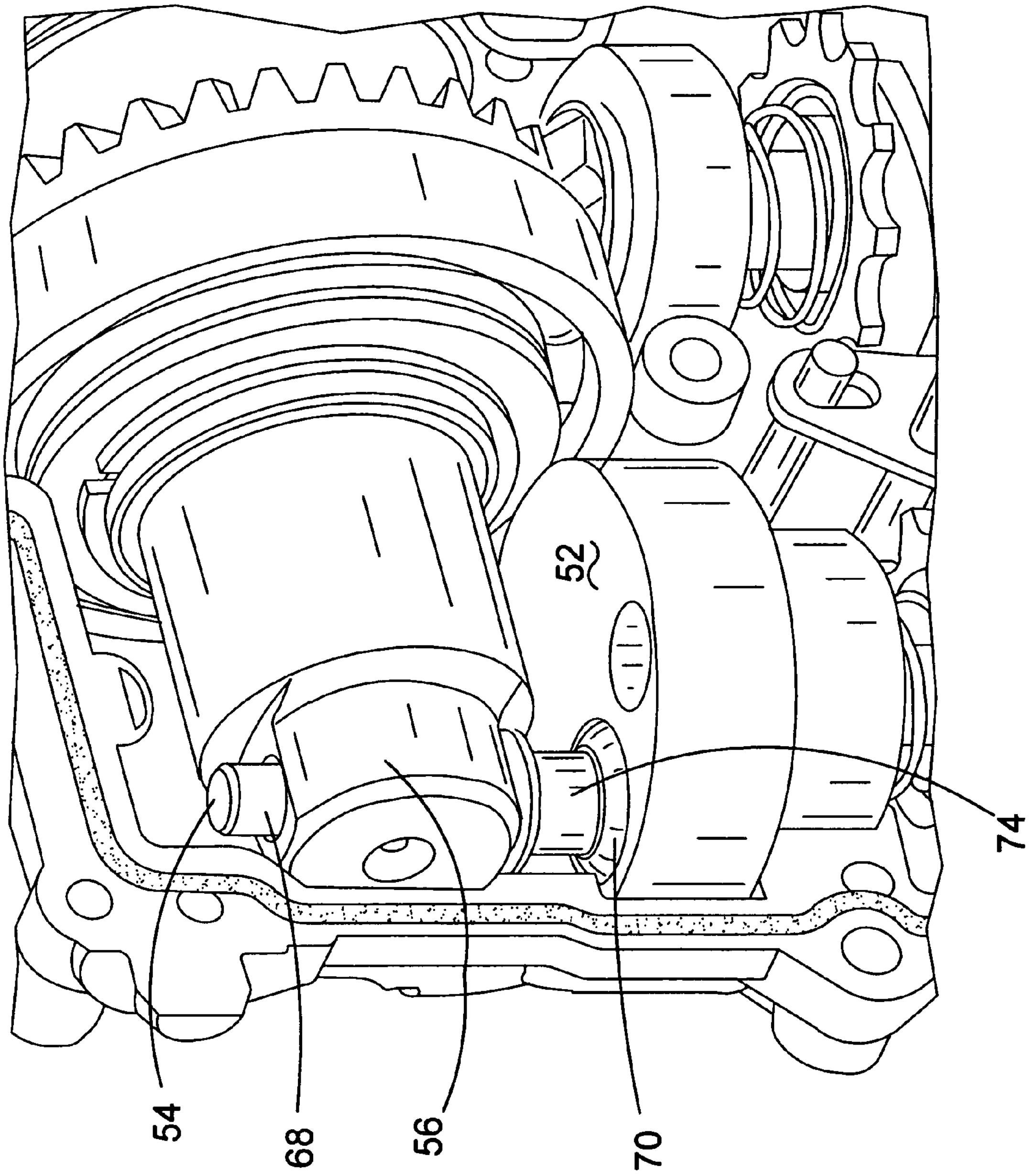
FIG. 6 is a partially cut away perspective view of part of the piston drive mechanism of FIG. 3 in its rearmost position.
Figure 7:
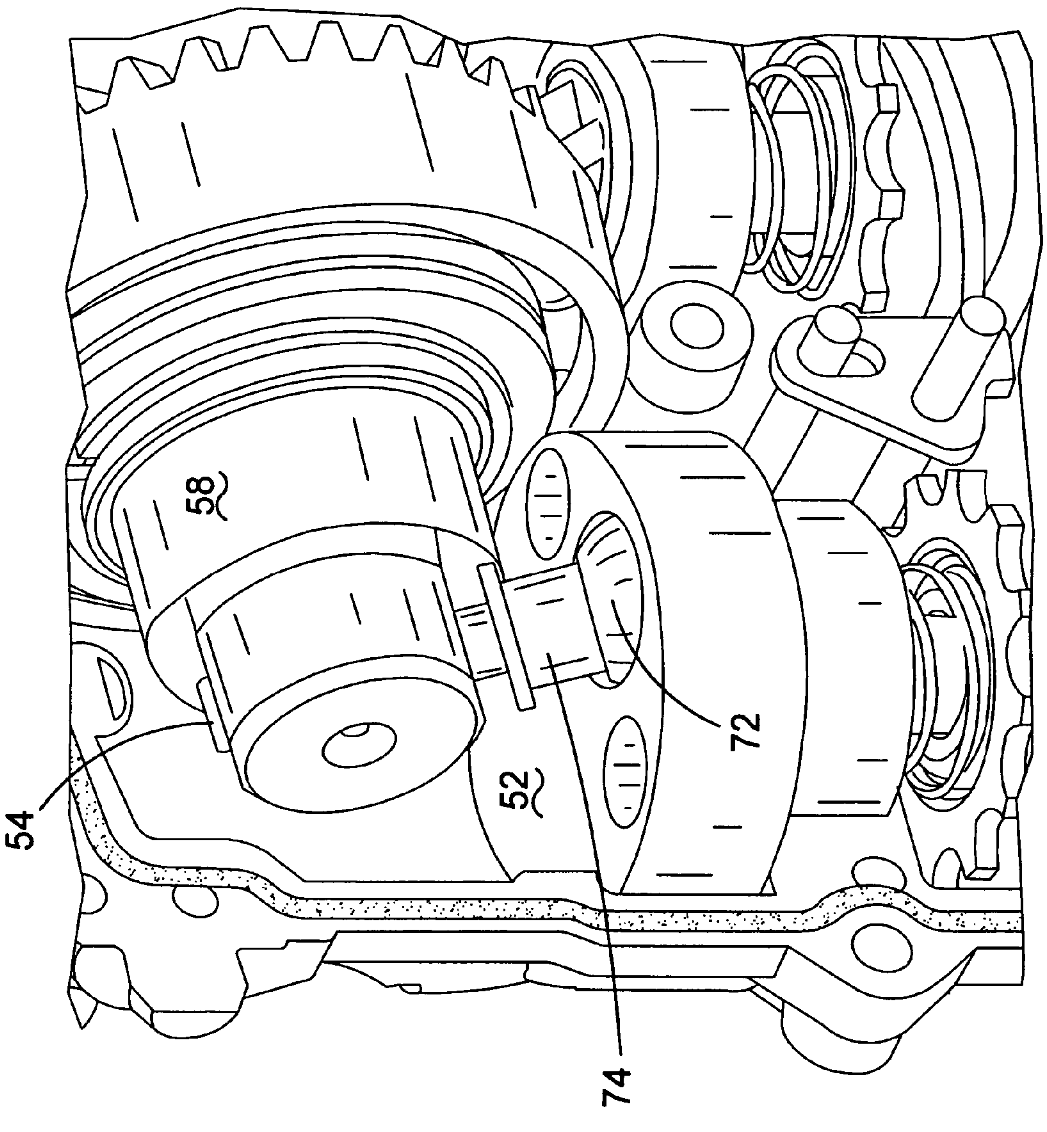
FIG. 7 is a partially cut away perspective view of part of the piston drive mechanism of FIG. 3 advanced through a quarter of a cycle of reciprocation from the position shown in FIG. 6.
Figure 8:
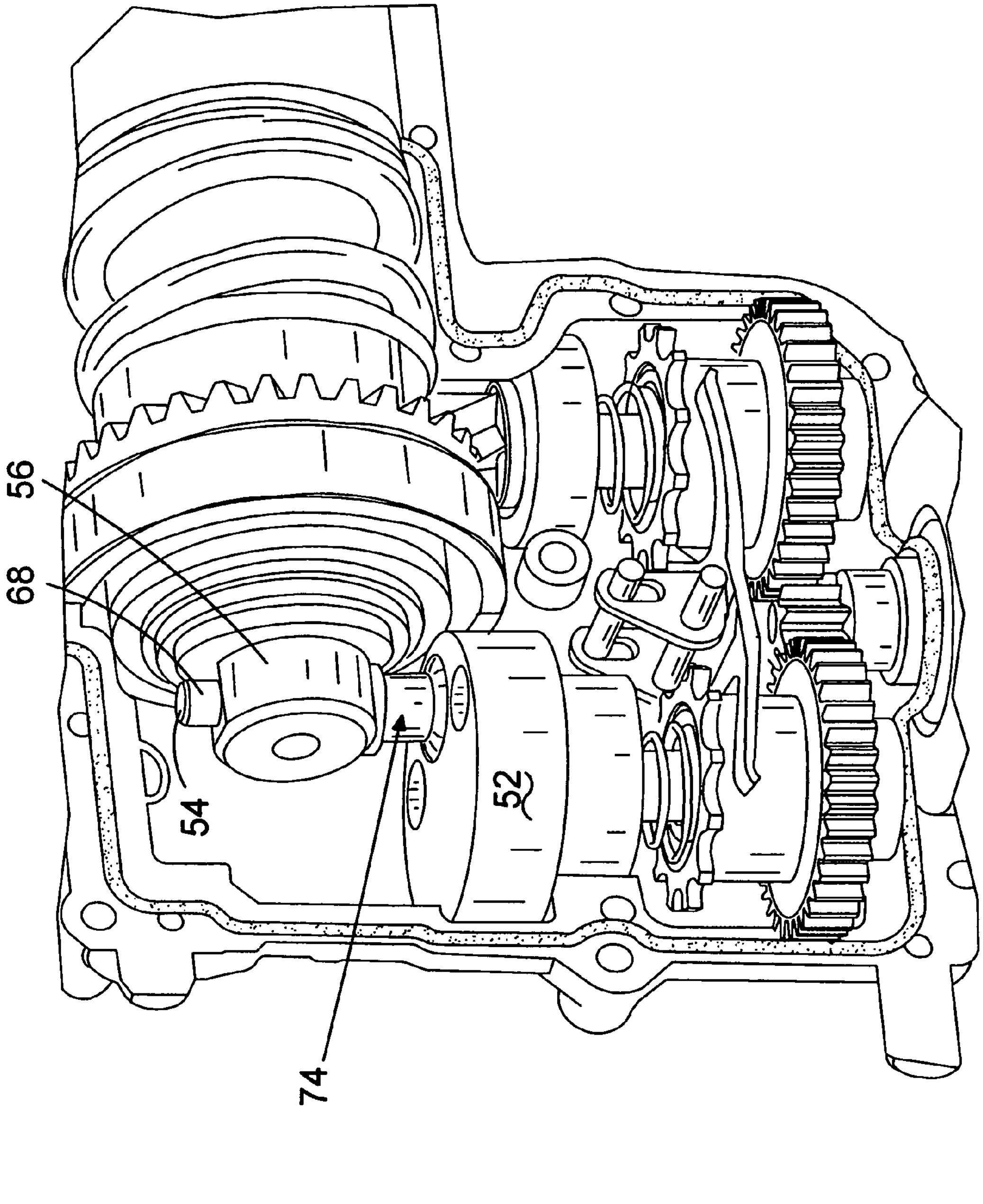
FIG. 8 is a partially cut away cross section of part of the piston drive mechanism of FIG. 3 advanced through half a cycle from the position shown in FIG. 6 to its foremost position.

Referring to FIGS. 6 to 8, as the crank plate 52 rotates in the anti-clockwise direction from the upright position shown in FIG. 6, to the position shown in FIG. 7, it can be seen that the crank pin 54 pushes the hollow piston 58 forwardly and also tilts to one side. As the crank pin 54 tilts, the cylindrical link member 68 slides downwardly in the cylindrical bearing 56. As the crank plate 52 rotates from the position of FIG. 7 to the position of FIG. 8 to push the hollow piston 58 to its foremost position, the crank pin 54 re-adopts an upright position and the cylindrical link member 68 of the crank pin 54 slides upwardly inside cylindrical bearing 56. It can be seen that by engagement of the collar member 74 with the underside of the cylindrical bearing 56 and the top of the part-spherical bearing 70, the crank pin 54 is prevented from moving too far inside the cylindrical bearing and out of engagement with the crank plate 52. There is therefore no need for an interference fit to trap the crank pin into engagement with the crank plate, which significantly simplifies assembly of the drive mechanism.

Figure 9:
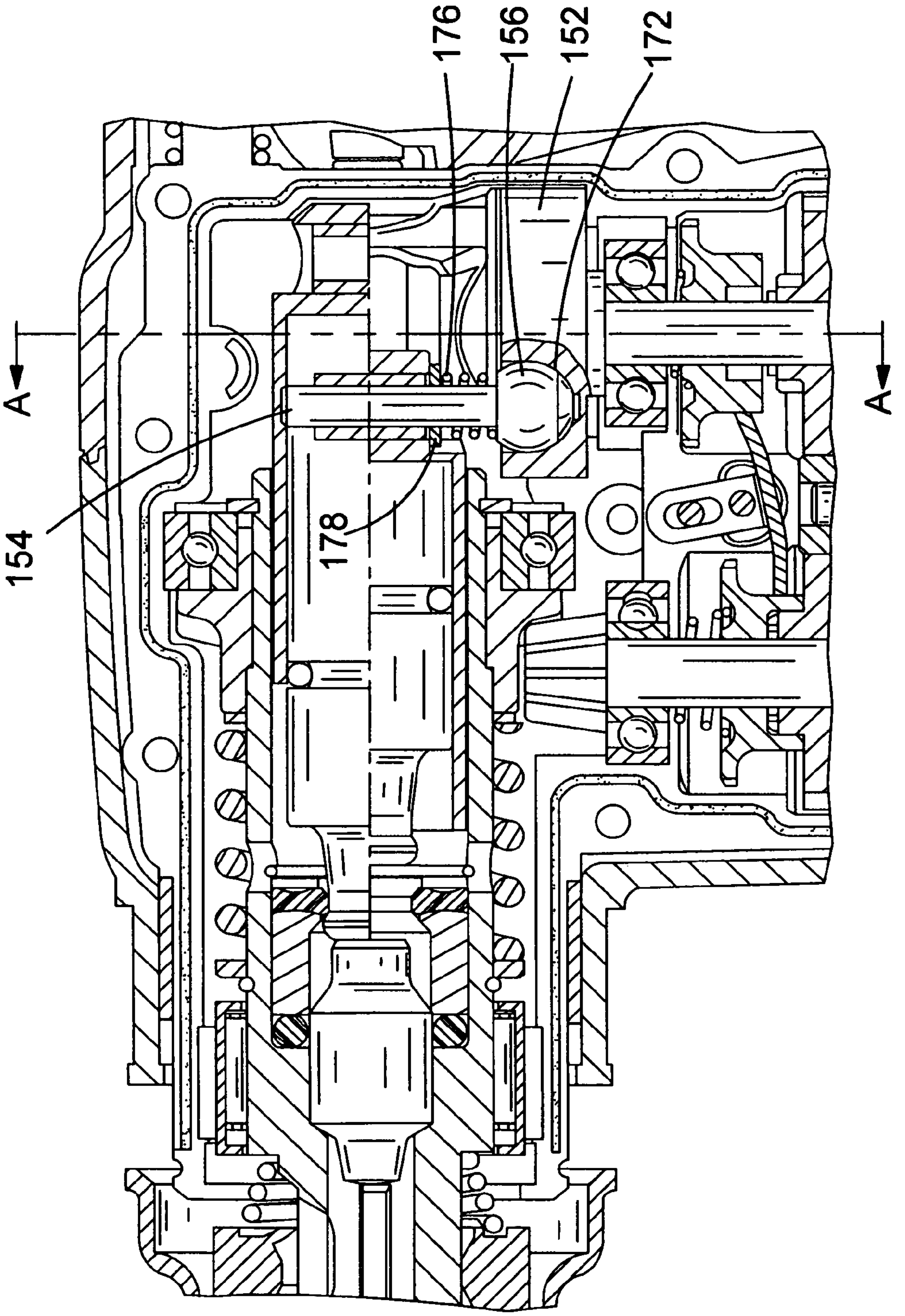
FIG. 9 is a side cross-sectional view of a piston drive mechanism for a hammer drill of a second embodiment of the present invention.
Figure 10:
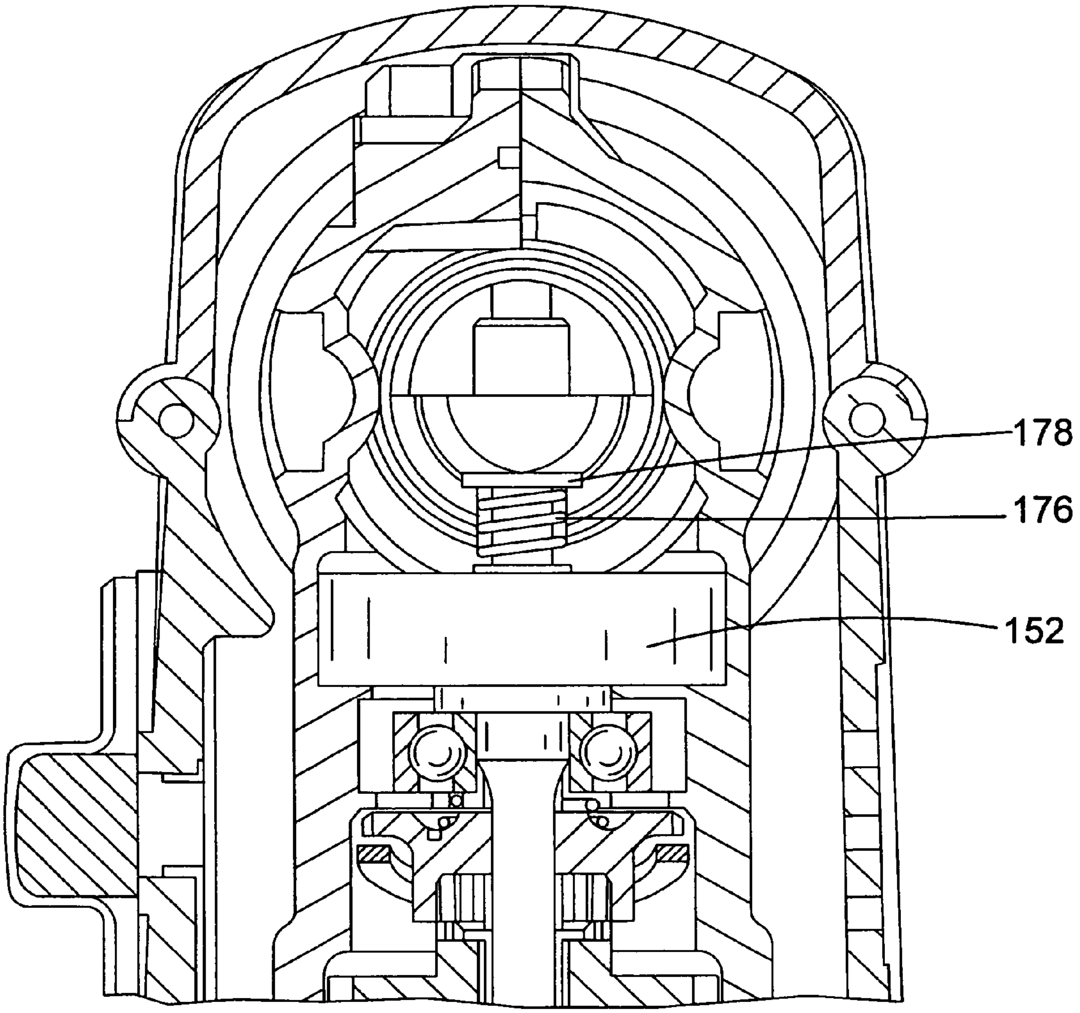
FIG. 10 is an enlarged cross-sectional view taken along line A-A of FIG. 9.

A hammer drill of a second embodiment of the invention is shown in FIG. 9 and 10, with parts common to the embodiment of FIGS. 3 to 8 denoted by like reference numerals but increased by 100.

Crank pin 154 is of the same construction as the embodiment of FIGS. 3 to 8. However, in the embodiment of FIGS. 9 and 10 the collar member 176 is a coil spring. A washer 178 is provided between the collar coil spring 176 and the cylindrical bearing 156. The collar coil spring 176 has the further advantage of biasing the part-spherical bearing 170 of the crank pin 154 into engagement with the cup-shaped recess 172 of the crank plate 152 so that the part-spherical bearing is prevented from even partially moving out of engagement with the crank plate 152.

Figure 11:
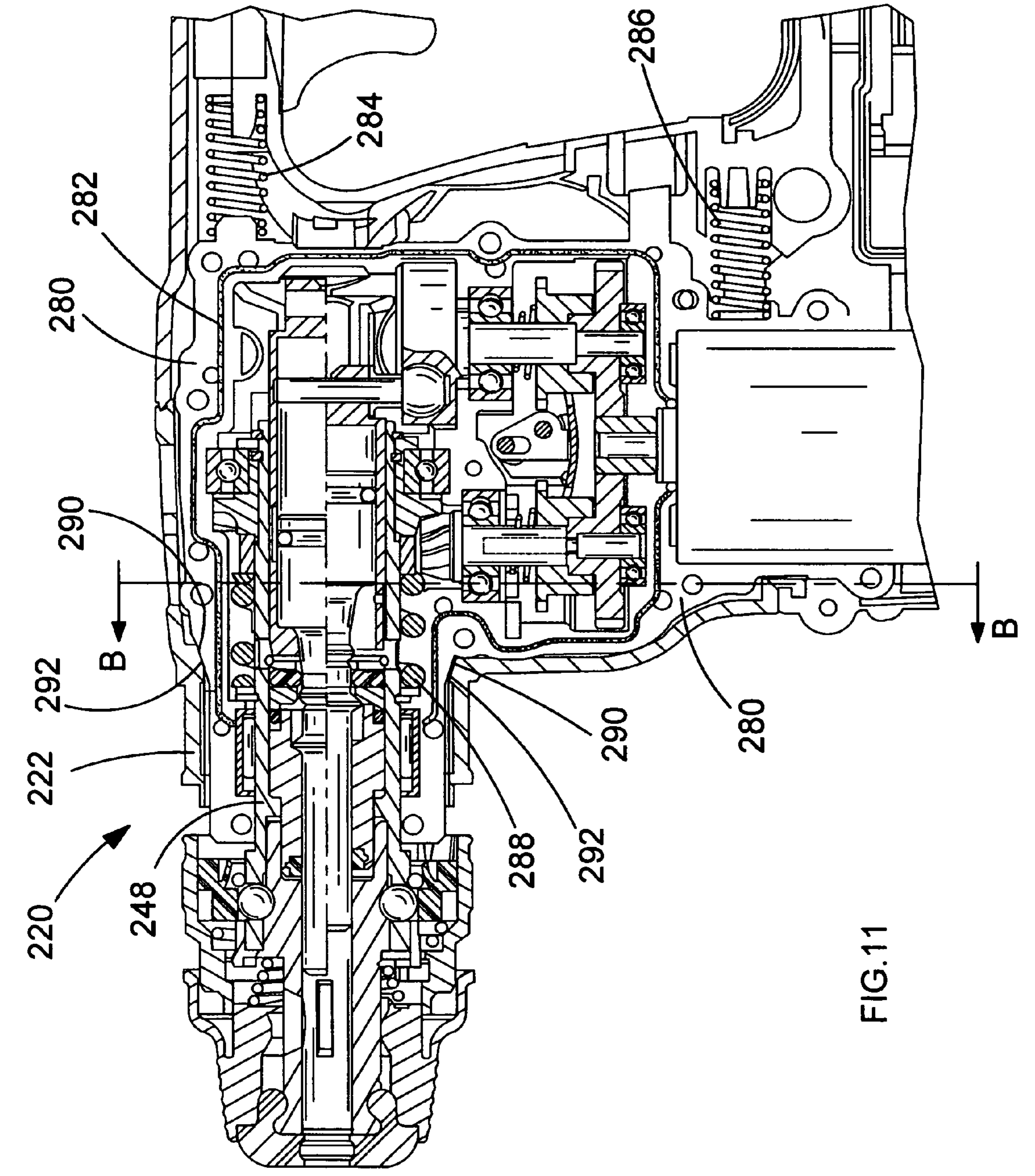
FIG. 11 is a side cross-sectional view of part of a hammer drill of a third embodiment of the present invention.
Figure 13:
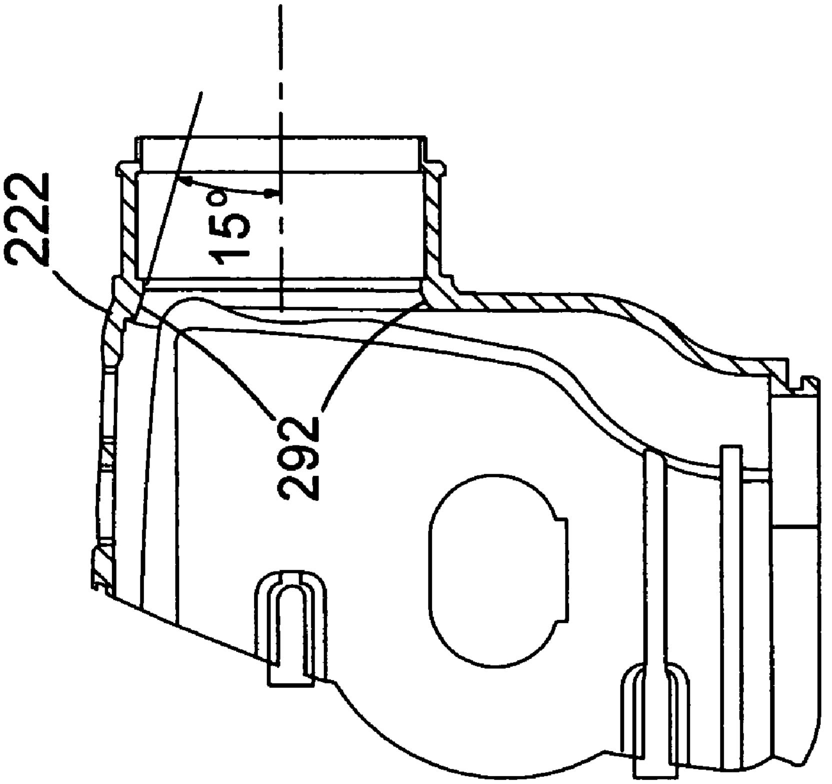
FIG. 13 is a cross section taken along line C-C of FIG. 12.
Figure 12:
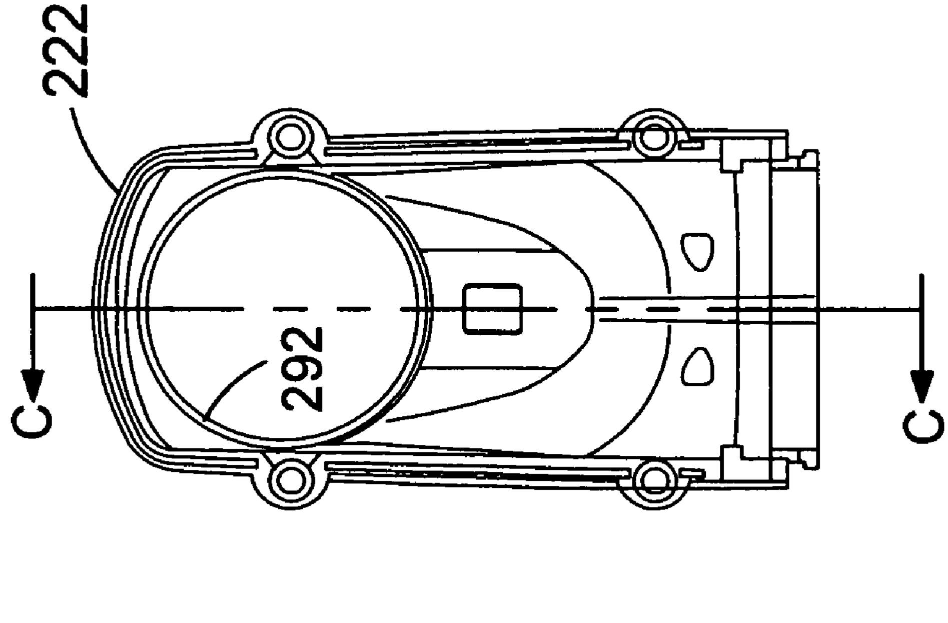
FIG. 12 is a cross-sectional view taken along line B-B of FIG. 11, with parts of the transmission mechanism removed for clarity.

A hammer drill of a third embodiment of the invention is shown in FIGS. 11 to 13, with parts common to the embodiment of FIGS. 3 to 8 denoted by like reference numerals but increased by 200.

The transmission housing 280 is formed from two clamshell halves of durable plastics or cast metal material. The two clamshell halves trap and compress an O-ring 282 therebetween. The transmission housing 280 is supported by first and second damping springs 284 and 286 at its rearward end. The transmission housing 280 is also mounted on parallel rails (not shown) disposed within the tool housing 222 such that the transmission housing 280 can slide a small distance relative to the tool housing 222 backwards and forwards in the direction of the longitudinal axis of the spindle 248.

The spring coefficients of damping springs 284 and 286 are chosen so that the transmission housing 280 slides to a point generally mid-way between its limits of forward and backward travel when the hammer drill is used in normal operating conditions. This is a point of equilibrium where the forward bias of the damping springs 284 and 286 equals the rearward force on the transmission housing 280 caused by the user placing the hammer drill 220 against a workpiece and leaning against the tool housing 222.

The forward end of the transmission housing 280 has a generally part-conical portion 290, which abuts a corresponding part-conical portion 292 formed on the tool housing 222. The part conical portions 290 and 292 form an angle of approximately 15° with the longitudinal axis of the spindle 248. The interface defined by the part-conical portions 290 and 292 defines a stop at which the transmission housing 280 rests against the tool housing 222 when the hammer drill 220 is in its inoperative condition. When the hammer drill 220 is being used in normal operating conditions, a gap opens up between the surfaces of the part-conical portions 290 and 292 which helps to damp axial and lateral vibrations that would otherwise be directly transmitted from the tool bit (not shown) to the user holding the hammer drill 220. Naturally, this gap slightly increases as the transmission housing moves backwards against the bias of the damping springs 282, 286. This helps to damp the increased axial and lateral vibrations which may arise when the user applies greater forward pressure to the hammer drill 220. However, the gap is sufficiently small that the hammer drill 220 and the transmission housing 280 can always be adequately controlled by the user via the interface between the part-conical portions 290, 292 which maintains alignment of the transmission housing 280 with the tool housing 222.

Figure 14:
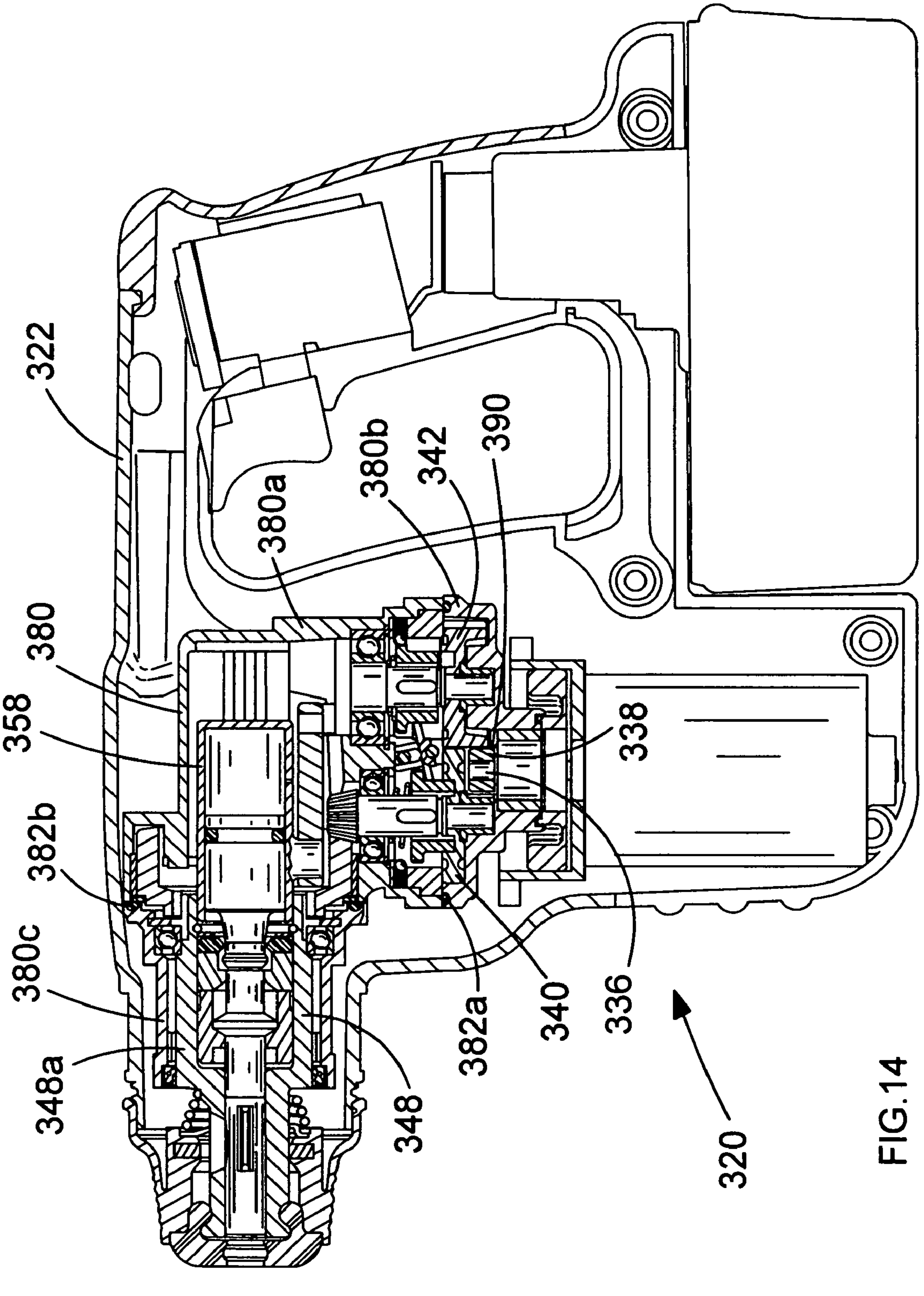
FIG. 14 is a side cross-sectional view of a hammer drill of a fourth embodiment of the present invention.
Figure 15A:
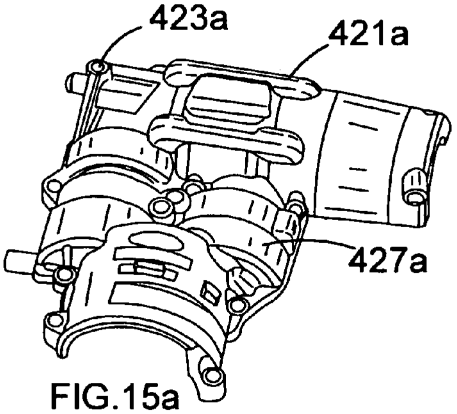
FIG. 15*a* is a perspective view from outside of a right clamshell half of a two part transmission housing of a hammer drill of a fifth embodiment of the present invention.
Figure 15B:
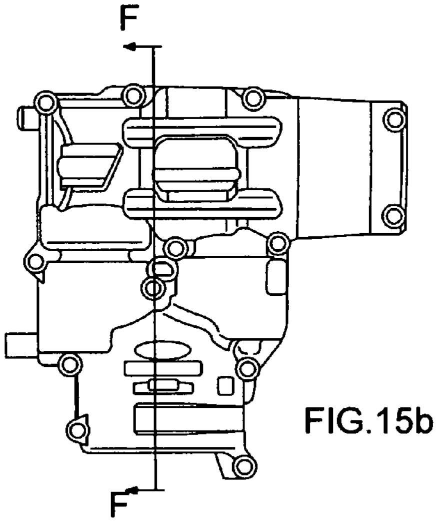
FIG. 15*b* is a side view of the outside of the clamshell half of FIG. 15*a;*
Figure 15D:
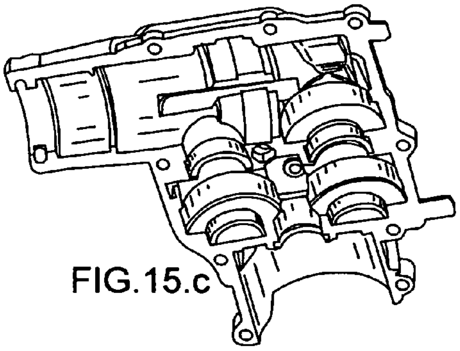
FIG. 15*d* is a side view of the inside of the clamshell half of FIG. 15*a;*
Figure 15D:
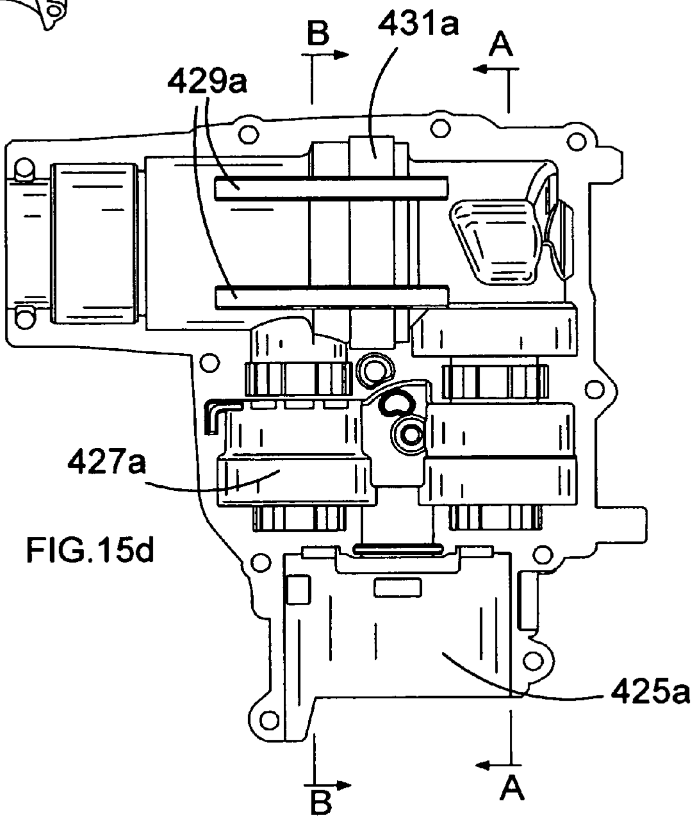
Figure 15E:
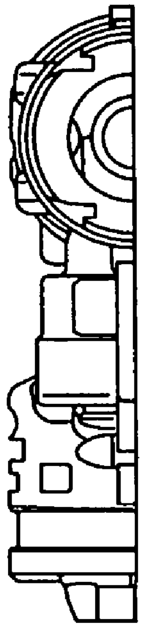
FIG. 15*e* is a front view of the clamshell half of FIG. 15*a;*
Figure 15F:
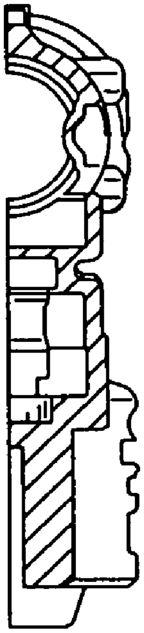
FIG. 15*f* is a cross-sectional view taken along line A-A of FIG. 15*d;*
Figure 15G:
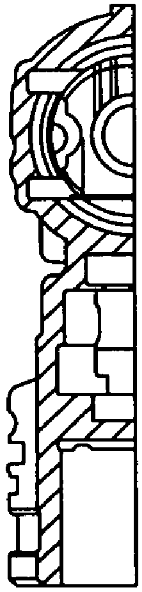
FIG. 15*g* is a cross-sectional view taken along line B-B of FIG. 15*d;*
Figure 15H:
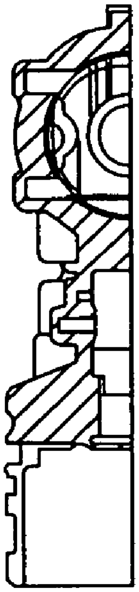
FIG. 15*h* is a cross-sectional view along line F-F of FIG. 15*b;*
Figure 16A:
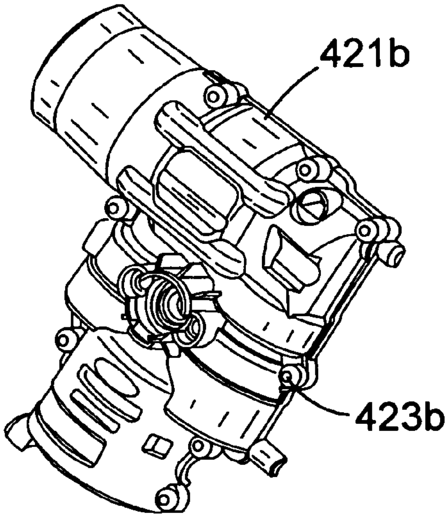
FIG. 16*a* is a perspective view from the outside of a left clamshell half corresponding to the right clamshell half of FIGS. 15*a* to 15*h;*
Figure 16B:
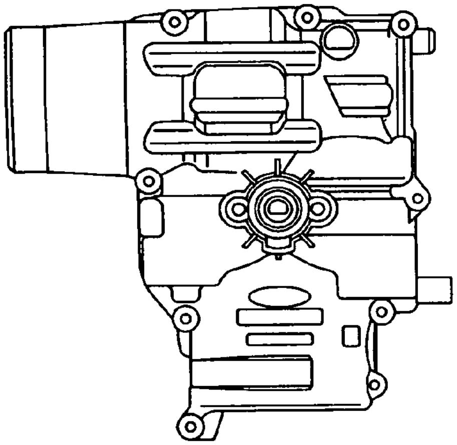
FIG. 16*b* is a side view of the outside of the clamshell half of FIG. 16*a;*
Figure 16C:
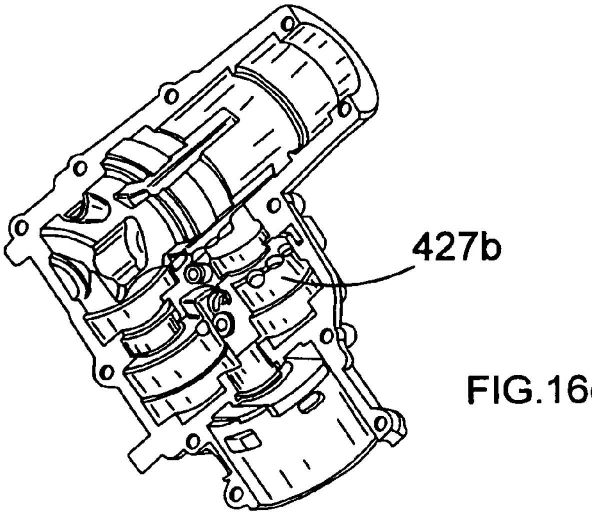
FIG. 16*c* is a perspective view of the inside of the clamshell half of FIG. 16*a;*
Figure 16D:
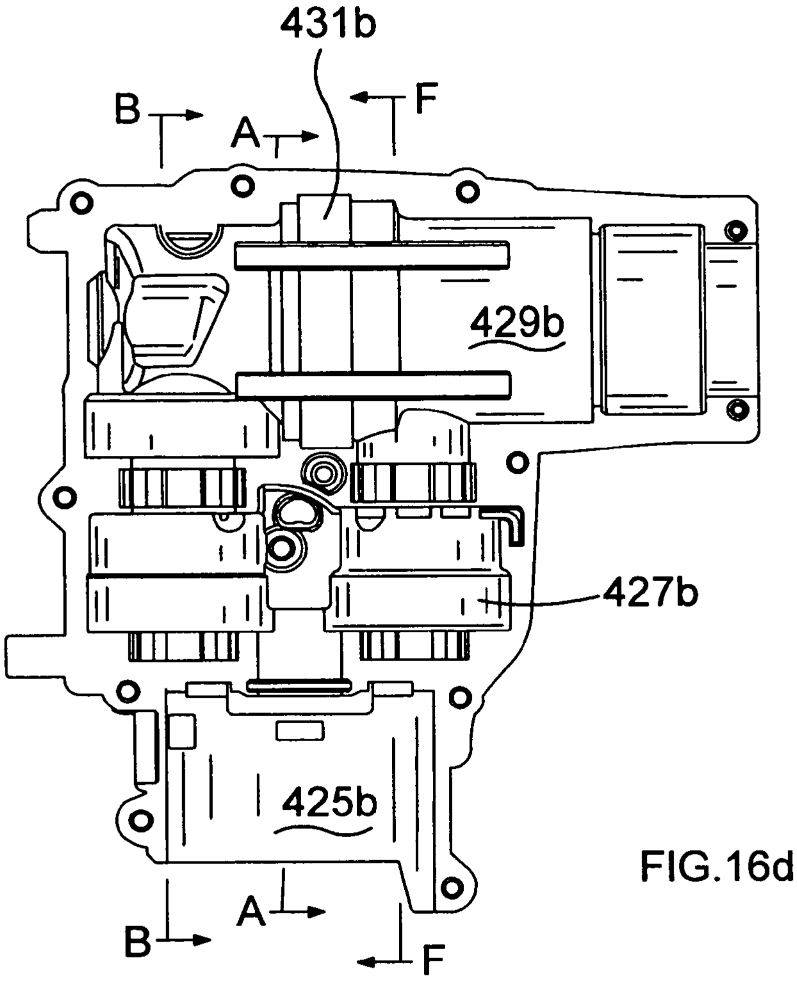
FIG. 16*d* is a side view of the inside of the clamshell half of FIG. 16*a;*
Figure 16E:
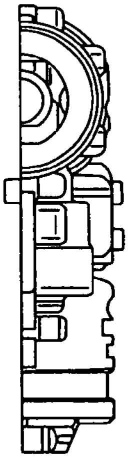
FIG. 16*e* is a front view of the clamshell half of FIG. 16*a;*
Figure 16F:
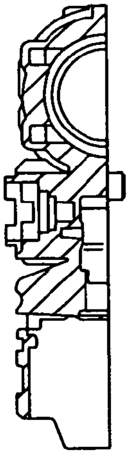
FIG. 16*f* is a cross-sectional view along line A-A of FIG. 16*d;*
Figure 16G:
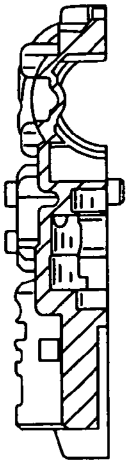
FIG. 16*g* is a cross-sectional view taken along line B-B of FIG. 16*d;*
Figure 16H:
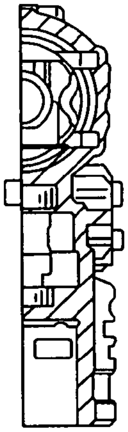
FIG. 16*h* is a cross-sectional view taken along line F-F of FIG. 16*d;*
Figure 17:
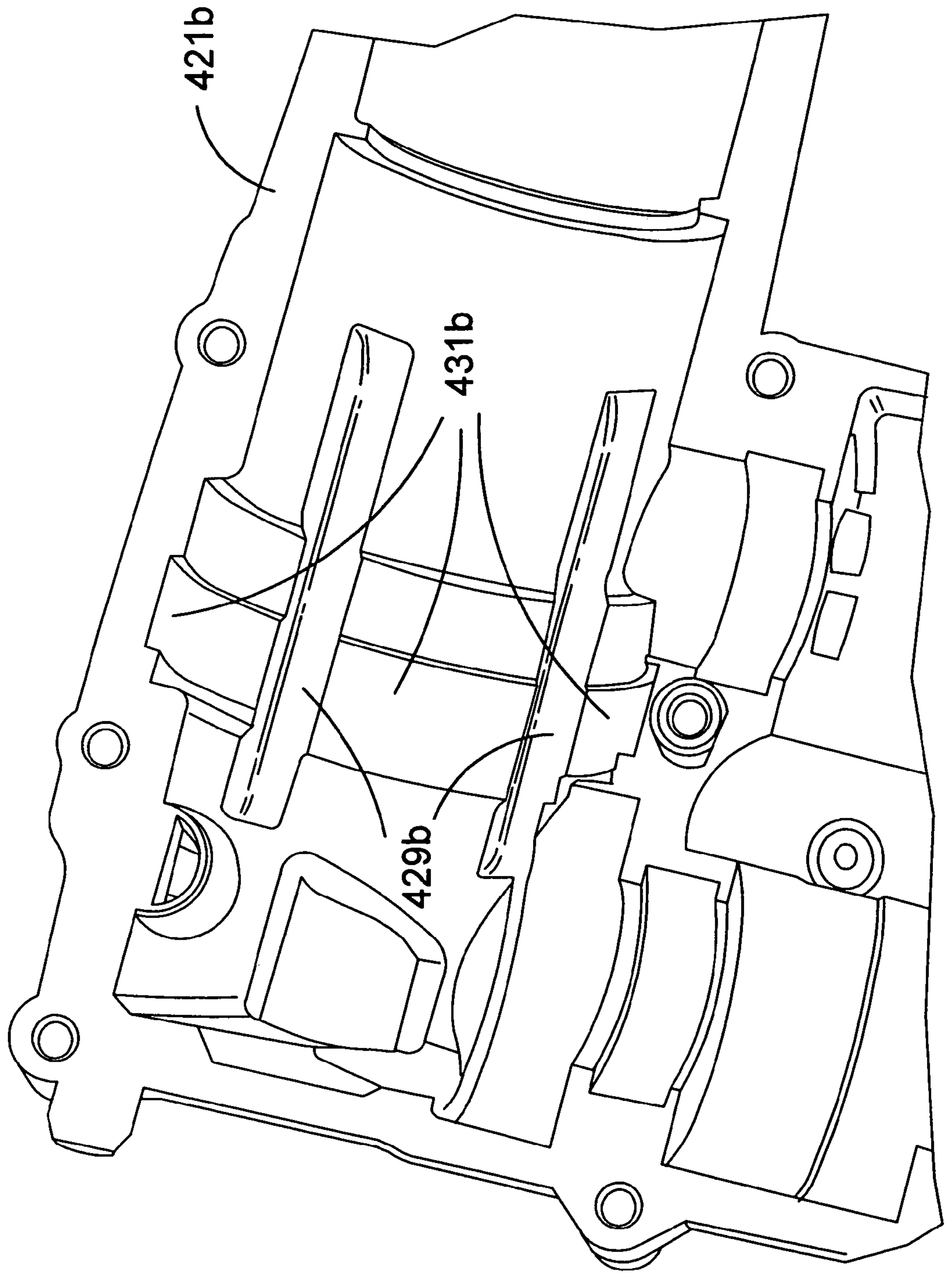
FIG. 17 is an enlarged perspective view of the inside of the clamshell half of FIG. 16.

A hammer drill of a fourth embodiment of the invention is shown in FIG. 14, with parts common to the embodiment of FIGS. 3 to 8 denoted by like reference numerals but increased by 300.

The hammer drill 320 has a tool housing 322. In this embodiment, the transmission housing 380 is formed from three housing portions. A generally L-shaped first housing portion 380*a* accommodates the transmission mechanism except for the first and second gears 340, 342 and the front end 348*a* of the spindle 348. The bottom end of the first housing portion 380*a* is mounted upon a second housing portion 380*b* such that a first O-ring 382*a* is trapped between the two portions to prevent the ingress of dust and dirt. The second housing portion 380*b* holds the lower parts of the transmission mechanism inside the first housing portion 380*a* and accommodates the first and second gears 340, 342. The second housing portion 380*b* has a motor output aperture 390 to allow the motor output shaft 336 access to the inside of the transmission housing and to enable the pinion 338 to drive the first and second gears 340, 342 of the transmission mechanism. A third housing portion 380*c* is mounted to the front end of the first housing portion 380*a* such that a second O-ring 382*b* is trapped between the two portions to prevent the ingress of dust and dirt. The third housing portion 380*c* holds the front parts of the transmission mechanism inside the first housing portion 380*a* and accommodates the front end 348*a* of the spindle.

The generally L-shaped first transmission housing portion 380*a* allows the transmission mechanism to be fully assembled inside the first transmission housing portion 380*a* from both its ends. For example, the hollow piston and spindle assemblies can be inserted into the front end of the first transmission housing portion 380*a*, and the first transmission housing portion 380*a* can then be turned through 90° and the various gears and mode change mechanism can be inserted through the bottom end and dropped into place to engage the spindle 348 and hollow piston 358. The second and third transmission housing portions 380*b* and 380*c* can then be mounted to the first transmission housing portion 380*a* in order to cap off the open ends of the first transmission housing portion 380*a*.

The first transmission housing portion 380*a* can be used as a standard platform (including standard hammer drive, rotary drive and mode change mechanisms) for several power tools, and the second and third transmission housing portions 380*b* and 380*c* changed to accommodate motors and spindles of differing sizes.

A hammer drill of a fifth embodiment of the invention has a transmission housing shown in FIGS. 15 to 20, with parts common to the embodiment of FIGS. 3 to 8 denoted by like reference numerals but increased by 400.

Referring to FIGS. 15 and 16, a transmission housing is formed from a right clamshell half 421*a* and a left clamshell half 421*b* formed from injection moulded high-grade strong plastics material. The clamshell halves 421*a*, 421*b* each have a plurality of threaded holes 423*a*, 423*b* respectively adapted to receive screws (not shown) such that the clamshell halves 421*a*, 421*b* can be joined together to form the transmission housing which encapsulates the transmission mechanism.

The two-part transmission housing is adapted to hold all the components of the transmission mechanism. Various indentations are moulded in the clamshell halves to provide support for these components. For example, first drive gear indentations 427*a* and 427*b* are shaped to support the first drive gear 40. A motor support portion 425*a* and 425*b* is adapted to support and partially encapsulate the top part of the electric motor 34.

The transmission housing is slidably mounted on a pair of guide rails (not shown) in the tool housing 22. As the transmission housing is disposed inside of the tool housing 22 and out of sight of the user, high-grade strong plastics material can be used in the construction of the transmission housing. This type of material is normally not suitable for external use on a power tool due to its unattractive colour and texture. High-grade strong plastics material also generally has better vibration and noise damping properties than metal. Strengthening ribs (not shown) can also be moulded into the plastics material to increase the strength of the transmission housing.

Referring to FIGS. 15 to 20, each of the clamshell halves 421*a* and 421*b* includes integrally formed overflow channels 429*a* and 429*b*. The clamshell halves also include respective ball bearing race support recesses 431*a* and 431*b* which are adapted to hold the ball bearing race 49 to support the spindle 48.

Figure 18:
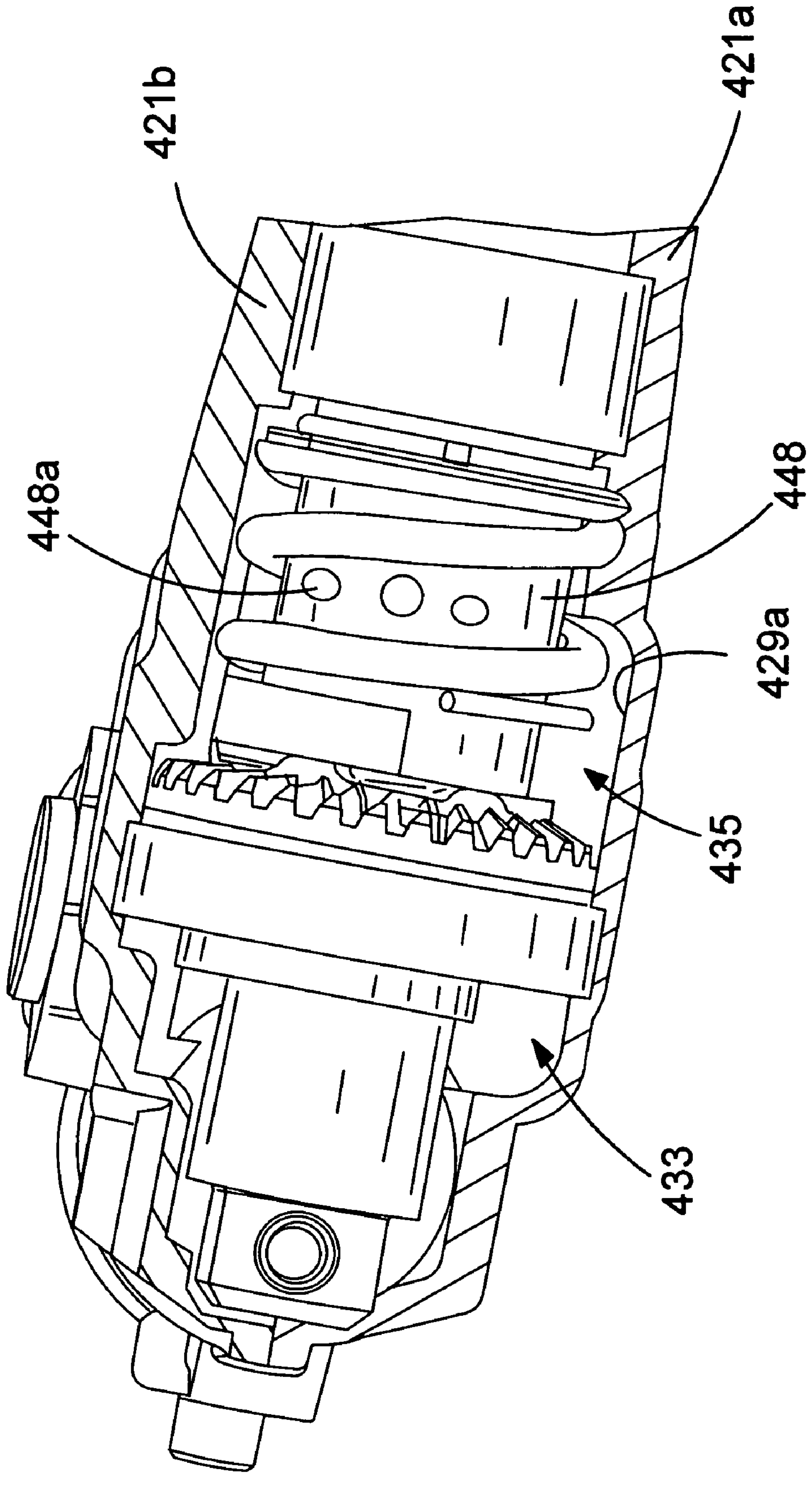
FIG. 18 is a partially cut away top view of part of a hammer drill incorporating the clamshell halves of FIGS. 15 and 16.
Figure 19:
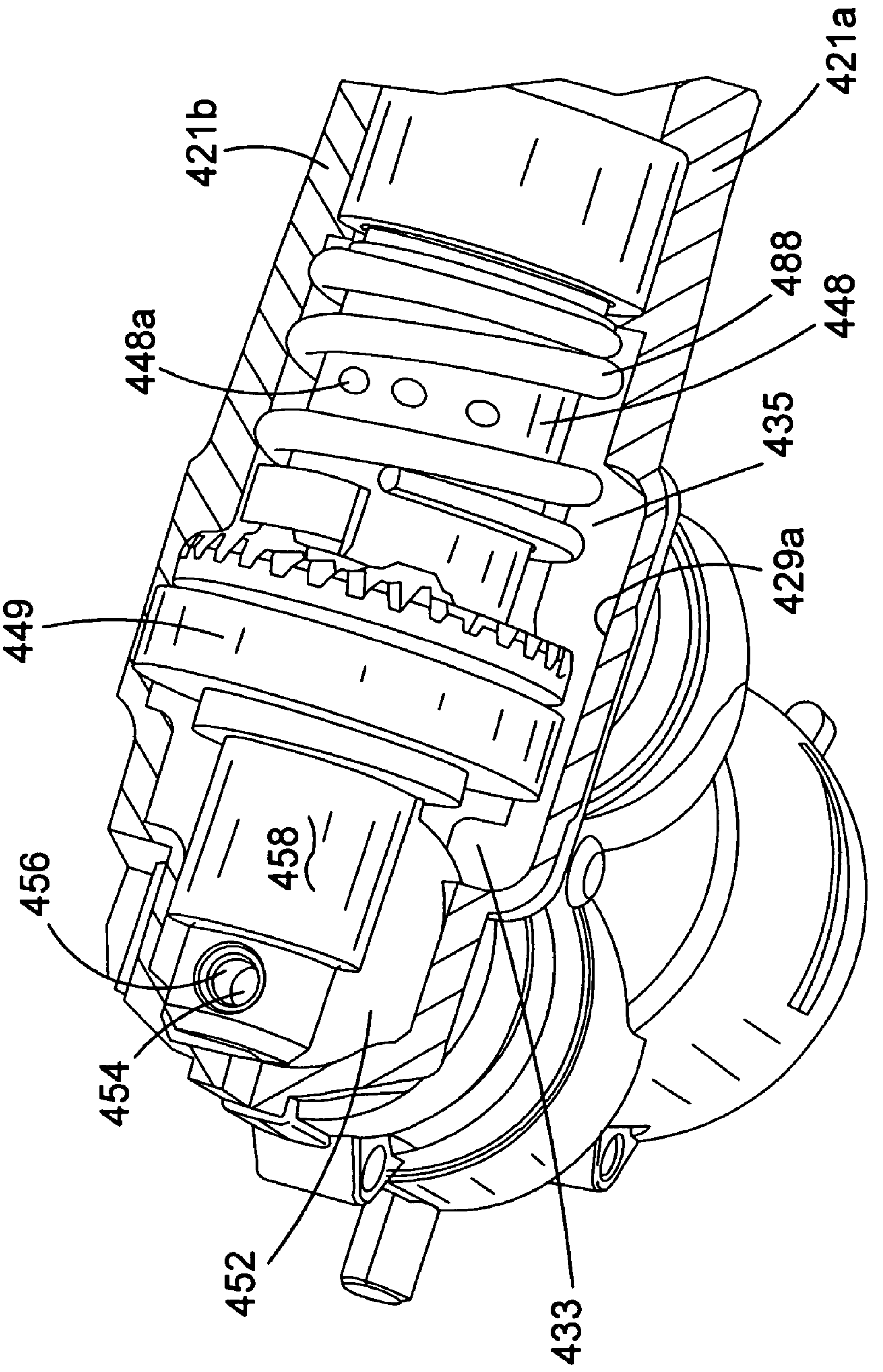
FIG. 19 is a partially cut away perspective view of part of the hammer drill of FIG. 18.
Figure 20:
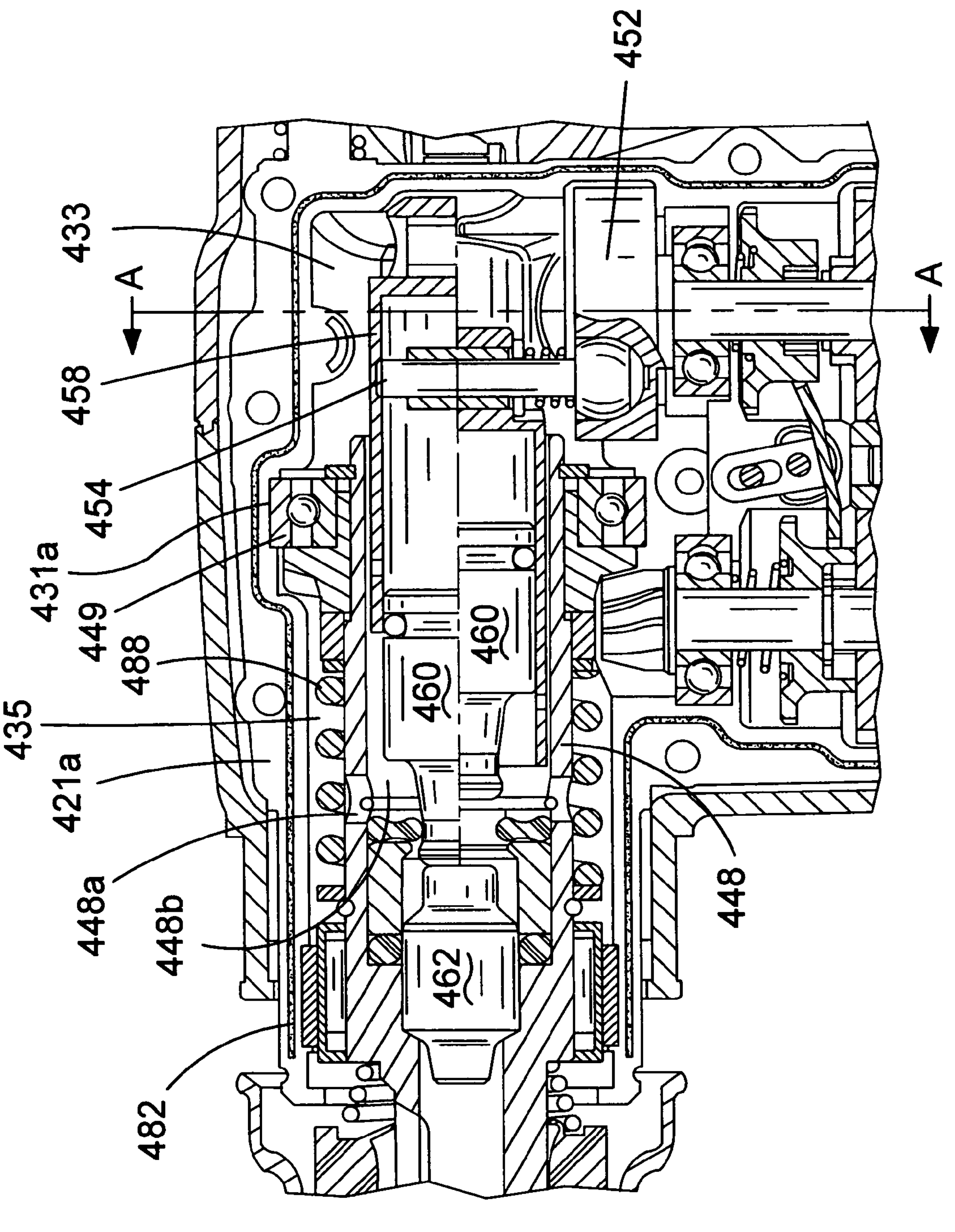
FIG. 20 is another side cross-sectional view of the piston drive mechanism.
Figure 21:
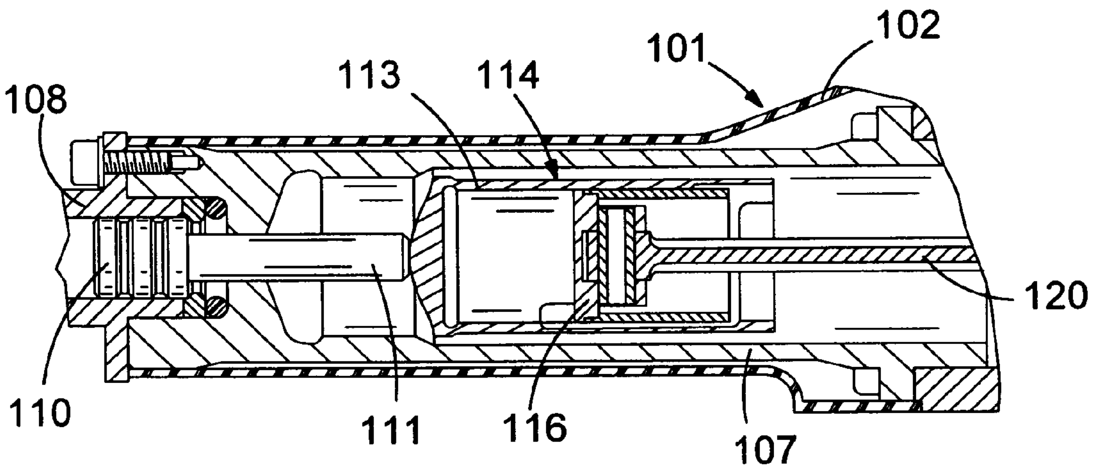
FIG.21 PRIOR ART
FIG. 21 is a cross-sectional view of a prior art piston drive mechanism.
Figure 22:
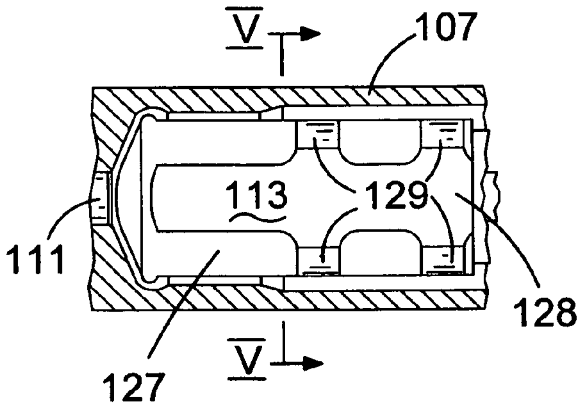
FIG.22 PRIOR ART
FIG. 22 is an enlarged partial cross-sectional view of the piston drive mechanism of FIG. 21.
Figure 23:
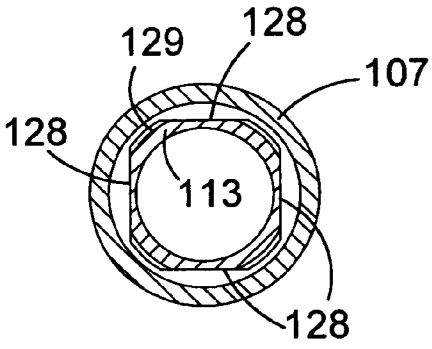
FIG.23 PRIOR ART
FIG. 23 is a cross-sectional view along line V-V of FIG. 22.
Figure 24A:
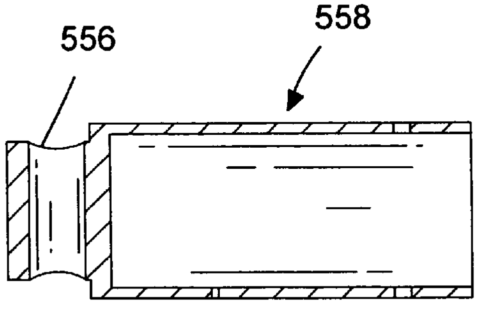
FIG. 24*a* is a cross-sectional view of a hollow piston of a hammer drill of a sixth embodiment of the present invention.
Figure 24B:
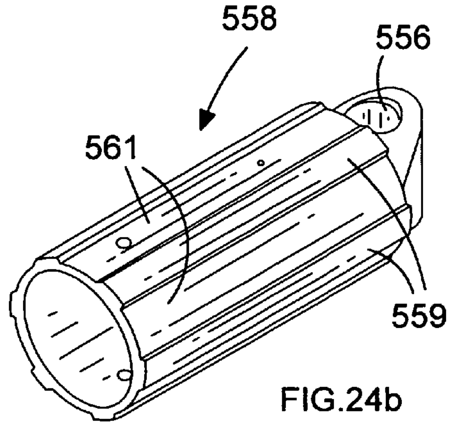
FIG. 24*b* is a perspective view from the side of the hollow piston of FIG. 24*a;*
Figure 24C:
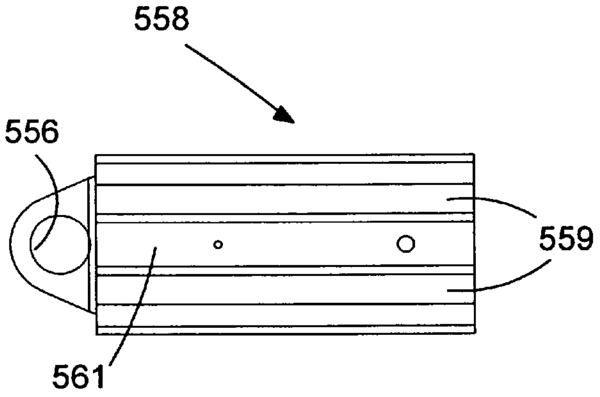
FIG. 24*c* is a top view of the hollow piston of FIG. 24*a;*
Figure 24D:
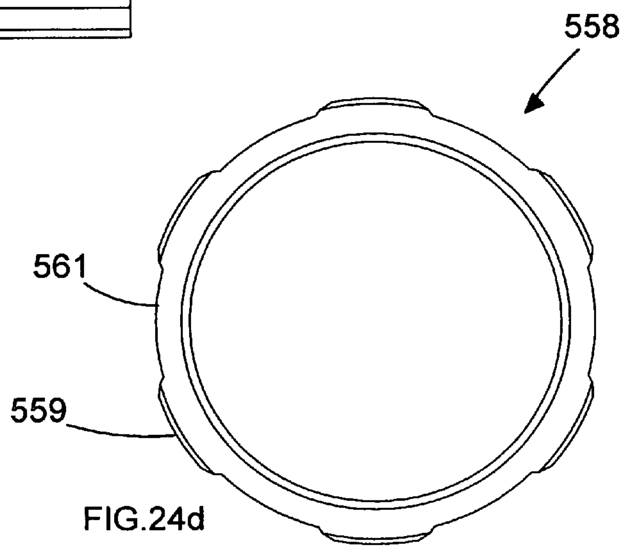
FIG. 24*d* is a view from the front of the hollow piston of FIG. 24*a;*

Referring in particular to FIGS. 18 to 20, the clam shell halves 421*a* and 421*b* mate to define a first transmission housing chamber 433 and a second transmission housing chamber 435 disposed on either side of the ball bearing race 449. The first and second transmission housing chambers 433 and 435 are interconnected by channels 429*a* and 429*b*. The rear end of the hollow piston 458, cylindrical bearing 456, the crank pin 454 and crank plate 452 are disposed in the first transmission housing chamber 433. The majority of the spindle 448 and the over-load spring 458 are disposed in the second transmission housing chamber 435. Part of the spindle 448 in the second transmission housing chamber has a circumferential array of vent holes 448*a*. The vent holes 448*a* allow communication between the second transmission housing chamber 435 and a spindle chamber 448*b* located inside the spindle 448 in front of the hollow piston 458 and the ram 460.

In hammer mode, the hollow piston 458 is caused to reciprocate by the crank plate 452. When the hollow piston 458 moves into the first transmission housing chamber 433 air pressure in the first transmission housing chamber 433 increases due to the reduction in the volume of first transmission housing chamber caused by the arrival of the hollow piston. At the same time, the hollow piston 458 and the ram 460 move out of the spindle 448. This causes a decrease in air pressure in the spindle chamber 448*b* due to the increase in volume in the spindle chamber caused by the departure of the hollow piston and the ram. The second transmission housing chamber 435 is in communication with the spindle chamber 448*b*, via the vent holes 448*b*, and so the air pressure in the second transmission housing chamber 435 decreases too. The air pressure difference is equalised by air flowing from the first transmission housing chamber 433 through the overflow channels 429*a* and 429*b* and into the second transmission housing chamber 435 and the spindle chamber 448*b*.

Conversely, when the hollow piston 458 goes into the spindle 448, air pressure in the first transmission housing chamber 433 decreases due to the increase in the volume of first transmission housing chamber caused by the departure of the hollow piston. At the same time, this causes an increase in air pressure in the spindle chamber 448*b* due to the decrease in volume in the spindle chamber caused by the arrival of the hollow piston and the ram. As mentioned above, the second transmission housing chamber 435 is in communication with the spindle chamber 448*b*, via the vent holes 448*b*, and so the air pressure in the second transmission housing chamber 435 increases too. The air pressure difference is equalised by air flowing back from the second transmission housing chamber 435 and the spindle chamber 448*b* through the overflow channels 429*a* and 429*b* and into the first transmission housing chamber 433.

As a result of this cyclic back and forth movement of air in the overflow channels 429*a*, 429*b*, compression of the air is eliminated, or significantly reduced, during reciprocation of the hollow piston 58. As such, the hammer drive mechanism does less work and loses less energy through inadvertently compressing trapped air. This increases the efficiency of the motor and the battery life of the hammer drill.

Figure 25:
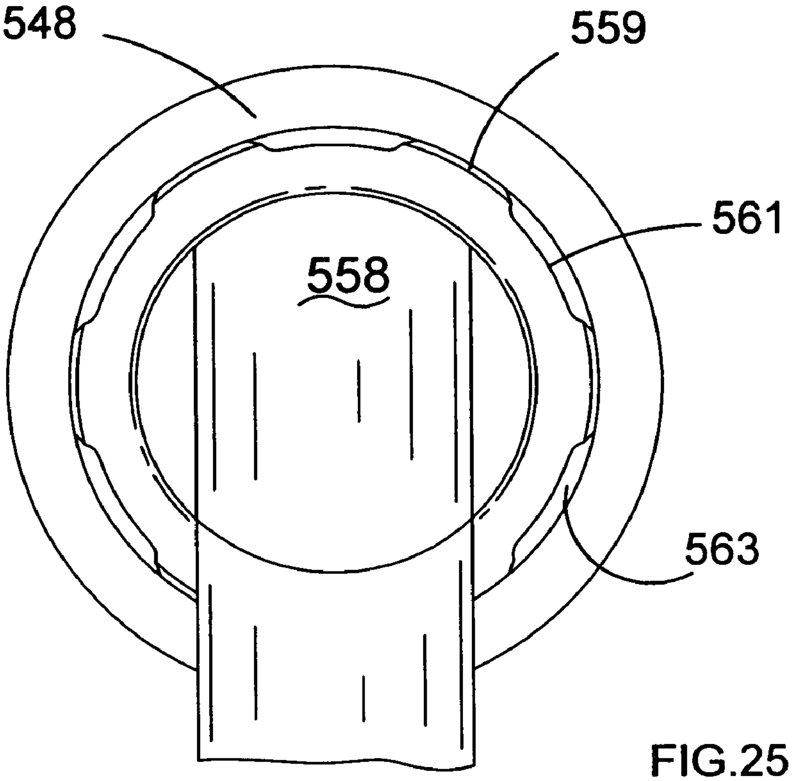
FIG. 25 is a rear view of a piston drive mechanism incorporating the hollow piston of FIGS. 24*a* to 24*d* mounted in a spindle.
Figure 26:
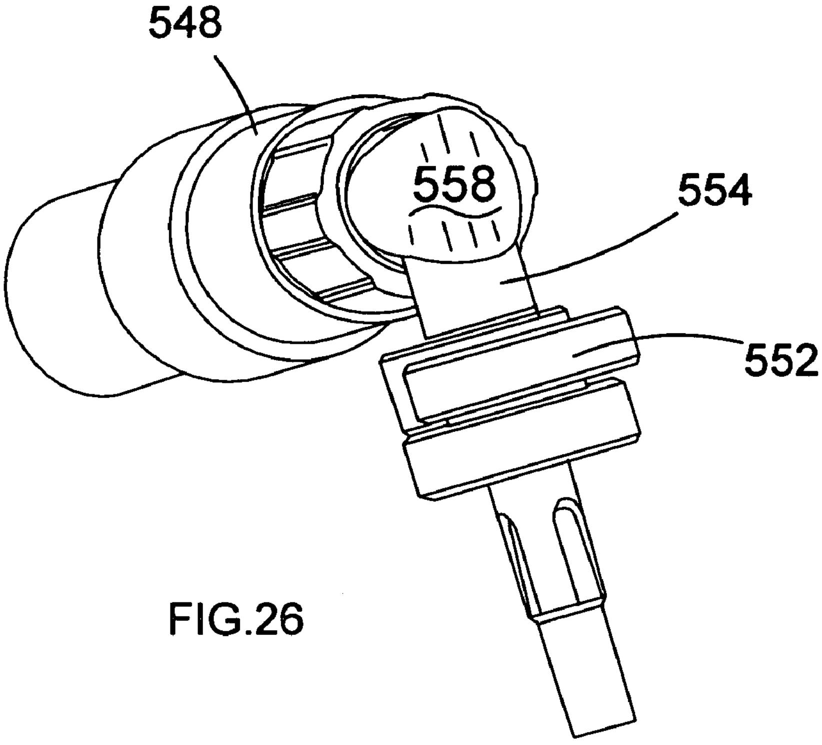
FIG. 26 is a perspective view from the rear of the piston drive mechanism of FIG. 25.

A hammer drill of a sixth embodiment of the invention has a hammer drive mechanism shown in FIGS. 24 to 26, with parts common to the embodiment of FIGS. 3 to 8 as denoted by like reference numerals but increased by 500.

Referring to FIGS. 24 to 26, a hollow piston 558 comprises a cylindrical bearing 556 that is adapted to receive a crank pin 554 in order to cause the hollow piston 558 to reciprocate inside the spindle 548. A ram (not shown) is slidably disposed inside the hollow piston 558 such that the ram is caused to execute a hammering action due to the air spring effect created inside hollow piston 558. A plurality of longitudinal ridges 559 are formed on the outer circumferential surface of the generally cylindrically-shaped hollow piston 558 to reduce the surface area of contact between the hollow piston 558 and the generally cylindrically-shaped spindle 548. A plurality of convex curvilinear shaped grooves 561 are formed in the gaps between the ridges. The grooves 561 circumscribe a cylinder of slightly reduced diameter than that of the outer circumferential surface of the hollow piston 558. As such, the grooves 561 are shallow enough to retain lubricant of normal viscosity throughout normal operation of the hammer drive mechanism.

The hollow piston 558 is slidably disposed inside the spindle 548. Rotation of crank plate 552 causes the crank pin 554 to act on cylindrical bearing 556 such that the hollow piston 558 reciprocates inside of the spindle 548. The spindle 548 may also rotate about the hollow piston 558. The longitudinal ridges 559 formed on the outer surface of the hollow piston 558 slidingly engage the inner surface of the spindle 548. It can be seen that the area of contact between the hollow piston 558 and the spindle 548 is reduced due to the engagement of only the ridges 559 with the inner surface of the spindle 548. The lubricant 563 contained in the grooves 561 reduces friction between the spindle 548 and the hollow piston 558. Air may also pass between the hollow piston 558 and the spindle, via the space created by the grooves 561, thereby improving cooling of the transmission mechanism. This air passage through the grooves may also assist in the equalisation of air pressure in the first and second transmission housing chambers 433, 435 already discussed under the heading of the fifth embodiment.

Figure 27:
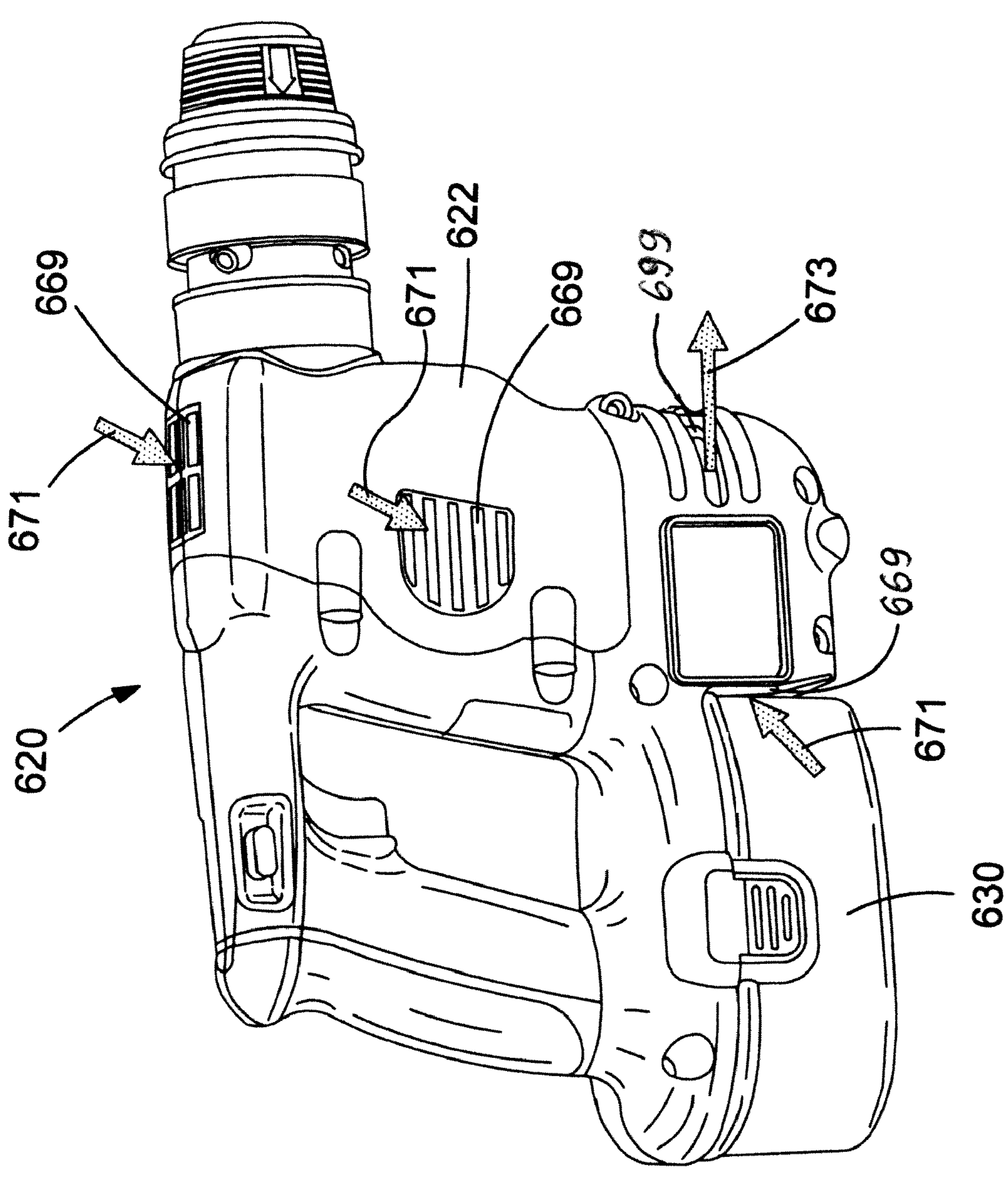
FIG. 27 is a side view of a hammer drill of a seventh embodiment of the present invention.
Figure 28:
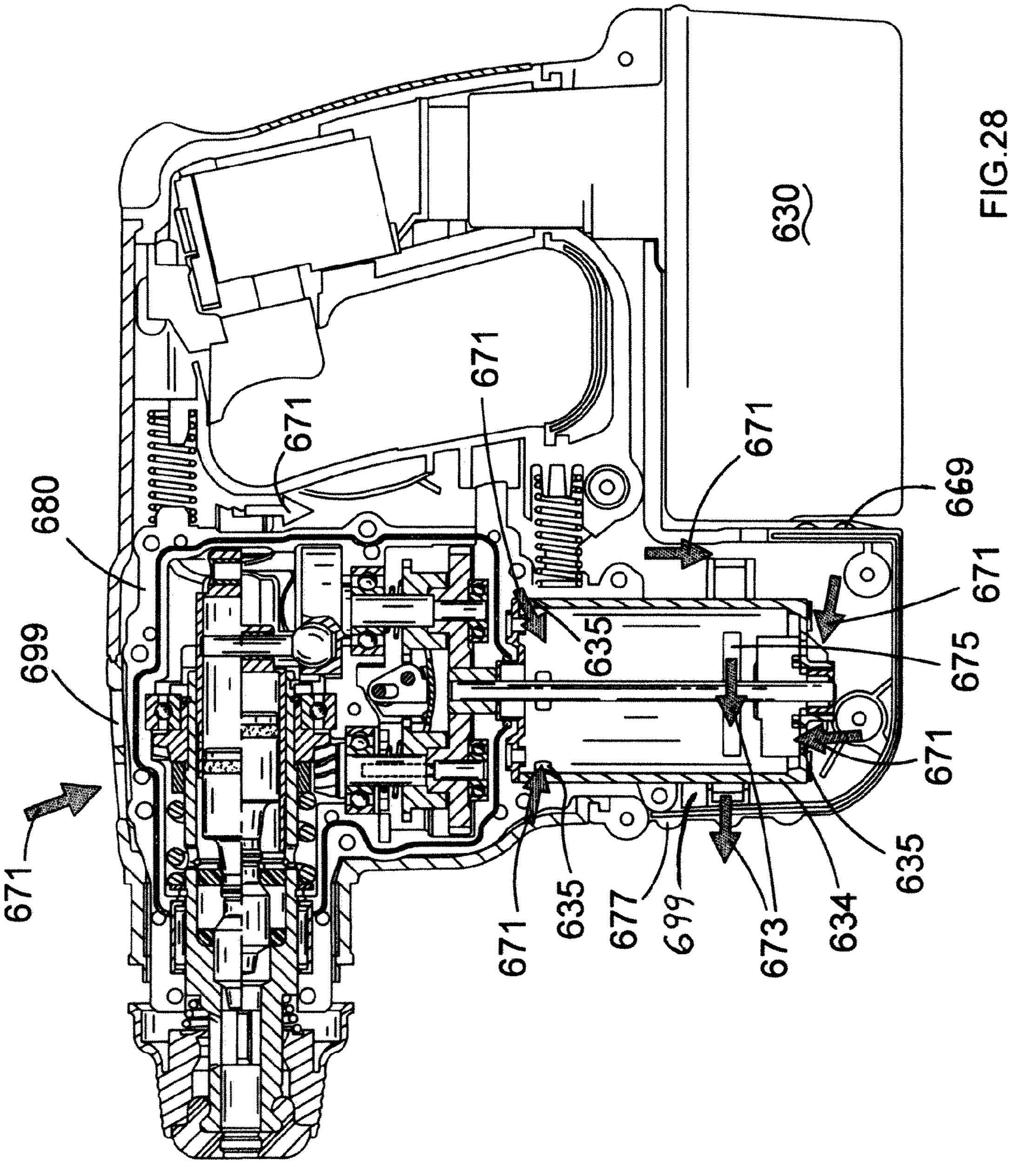
FIG. 28 is a side cross-sectional view of the hammer drill of FIG. 26.

A hammer drill of a seventh embodiment of the invention having a motor cooling system is shown in FIGS. 27 and 28, with parts common to the embodiment of FIGS. 3 to 8 denoted by like reference numerals but increased by 600.

A hammer drill 620 comprises a tool housing 622 in which a plurality of air vents 669 is formed. The air vents are adapted to either receive cool air from outside of the hammer drill or expel warm air from the inside of the hammer drill.

Referring to FIG. 28, a motor cooling fan (not shown) is disposed on the axis of the motor 634 in a position that is between the upper field coil (not shown) and the lower commutator (not shown) of the motor 634. A transmission housing 680, which may be of the two-part type or the three-part type described above, substantially encapsulates the transmission mechanism.

During operation of the power tool the cooling fan is driven by the motor. The cooling fan draws air axially through the motor and expels the air radially outwardly through holes 675 formed in the outer housing 677 of the motor 634. The cooling fan is vertically aligned with the holes 675 to make the radial expulsion of air easier. This causes air to be drawn in through the air vents 669 formed on the top of the housing 622, in the side of the housing 622 and between the housing 622 and the battery pack 630. The cool air follows a path through the tool housing 622 shown by cool air arrows 671. The cool air flows around the outside of the transmission housing 680 but inside the tool housing 622 such that air does not pass through the transmission mechanism which is sealed to prevent ingress of dirt.

A plurality of motor openings 635 are formed in the outer housing 677 of the motor 634 to enable cool air to pass into the motor to cool the motor. As a result of the position of the cooling fan, cool air is drawn across both the field coils of the motor and the motor commutator such that each of these components is individually cooled by air flowing downwards over the field coils and upwards over the commutator. Warm air is expelled through a front vent 669 in the front of the housing following a path shown by warm air arrows 673. The front vent 699 is vertically aligned with the holes 675 in the outer housing 677 of the motor 634.

It will be appreciated by persons skilled in the art that the above embodiment has been described by way of example only and not in any limitative sense, and that various alterations and modifications are possible without departure from the scope of the invention as defined by the appended claims.

The invention claimed is:

1. A power tool comprising:

an outer housing for gripping by a user;

a motor disposed in the outer housing and having an output shaft for actuating a working member of the tool, and including a motor housing having a plurality of apertures for permitting the flow of air through the motor;

a cooling fan adapted to be driven by the motor for causing air to flow past the motor; and a transmission mechanism adapted to actuate said working member in response to rotation of said output shaft, and having an inner housing for supporting the transmission mechanism in the outer housing, wherein the outer housing has at least one air inlet and at least one air outlet and the cooling fan is adapted to cause air to flow from at least one inlet to a space between said inner and outer housing then to said motor; and wherein the motor housing is connected to the inner housing in a manner sealed against air flow between the motor housing and the inner housing.

2. A power tool according to claim 1, further comprising at least one air inlet disposed on an upper surface of the outer housing, at least one air inlet disposed on a side of the outer housing, and at least one air inlet disposed on the outer housing adjacent a releasable battery pack in use.

3. A power tool according to claim 1, wherein said cooling fan is disposed between a field coil and a commutator of the motor.

4. A power tool according to claim 1, further comprising at least one air outlet disposed on the outer housing forwardly of the motor, and at least one air outlet disposed on the outer housing adjacent a releasable battery pack in use.

5. A power tool comprising:

an outer housing for gripping by a user, the outer housing including:

an upper surface defining a first air inlet;

a side surface defining a second air inlet;

a third surface adjacent to a releasable battery pack and defining a third air inlet; and a motor disposed in the outer housing and having an output shaft for actuating a working member of the tool;

a cooling fan adapted to be driven by the motor for causing air to flow past the motor; and a transmission mechanism adapted to actuate said working member in response to rotation of said output shaft, and having an inner housing for supporting the transmission mechanism in the outer housing, and wherein the cooling fan is adapted to cause air to flow from at least one inlet between said inner and outer housing to said motor.

6. A power tool according to claim 5, wherein the motor comprises a motor housing having a plurality of apertures for permitting the flow of air through the motor.

7. A power tool according to claim 6, wherein the motor housing is connected to the inner housing in a manner sealed against air flow between the motor housing and the inner housing.

8. A power tool according to claim 5, wherein said cooling fan is disposed between a field coil and a commutator of the motor.

9. A power tool according to claim 5, wherein the outer housing further includes a front surface defining an air outlet located forwardly of the motor.

10. A power tool according to claim 5, wherein the power tool is a hammer drill.

* * * * *